Figure 7:
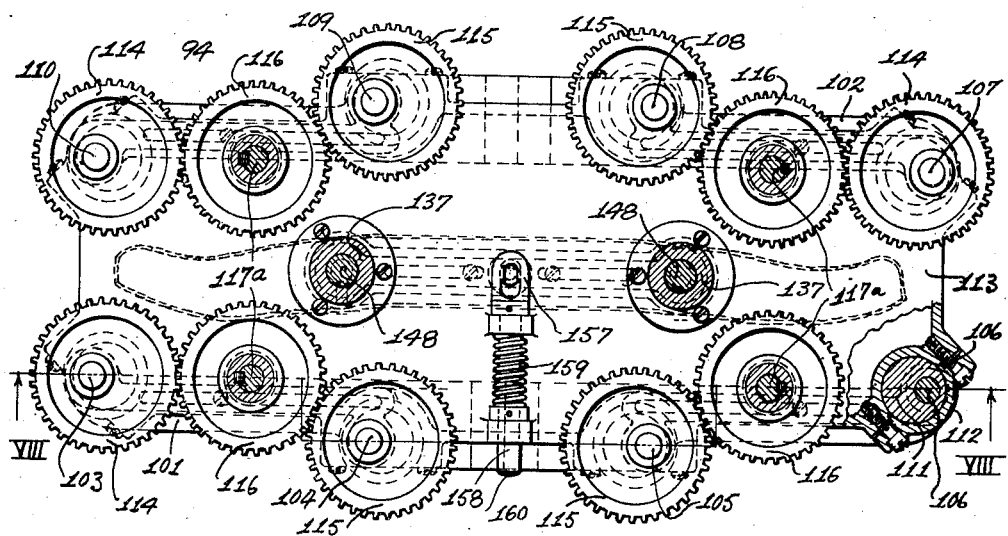

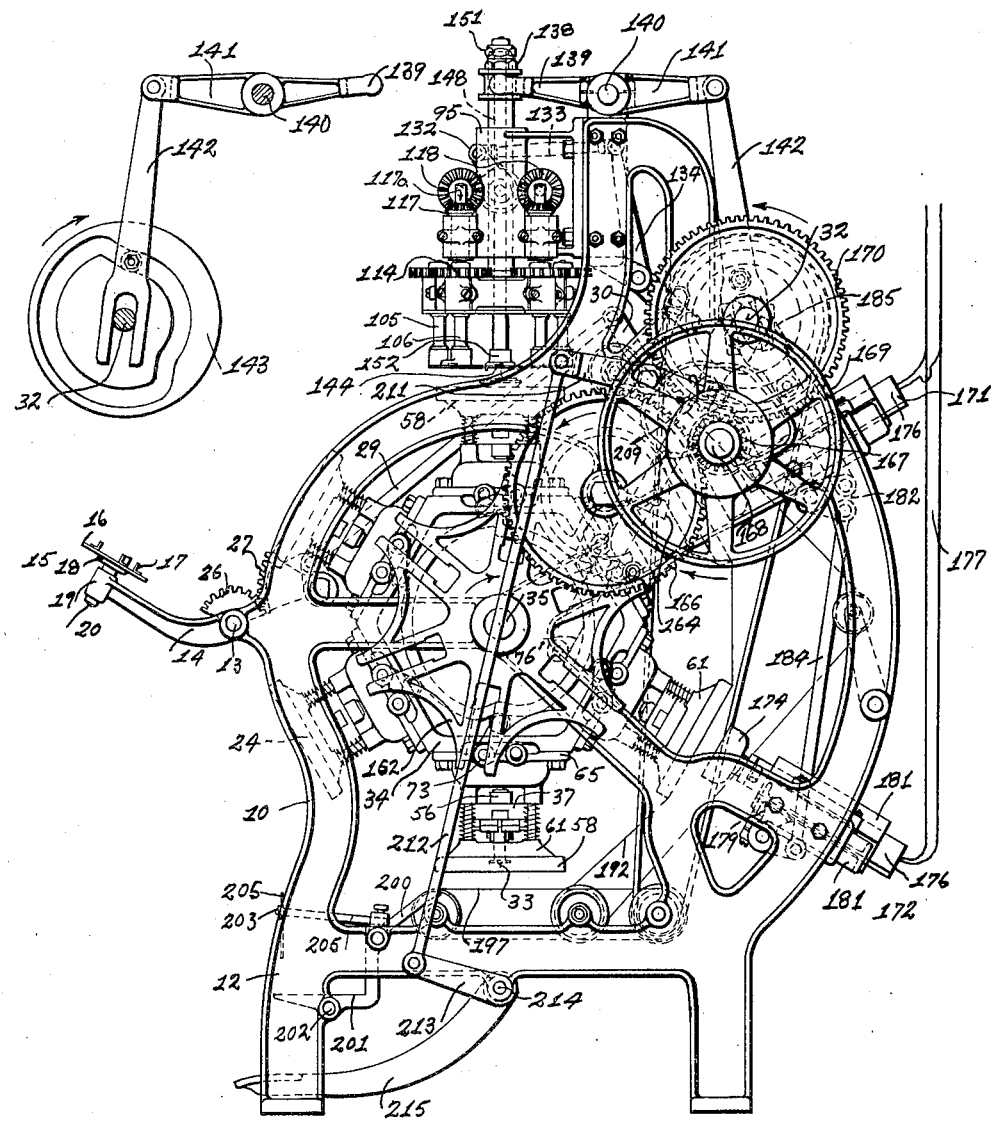

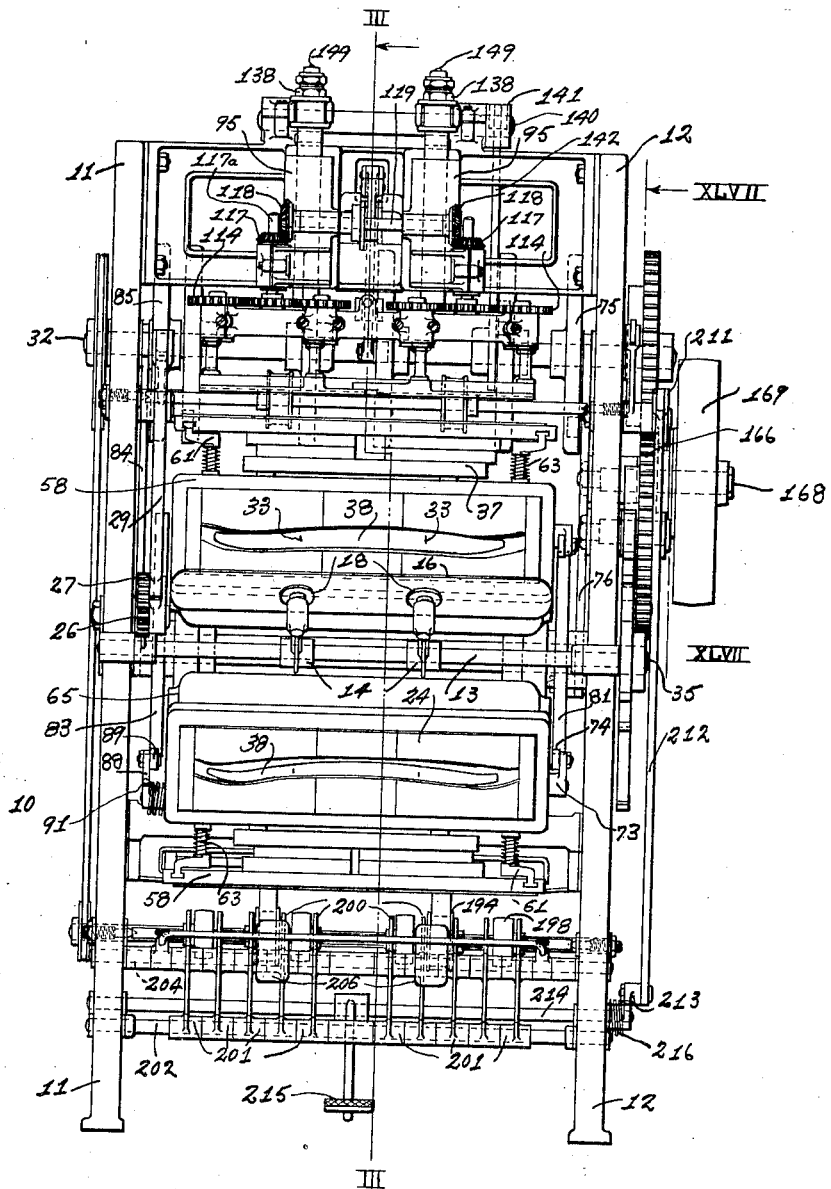

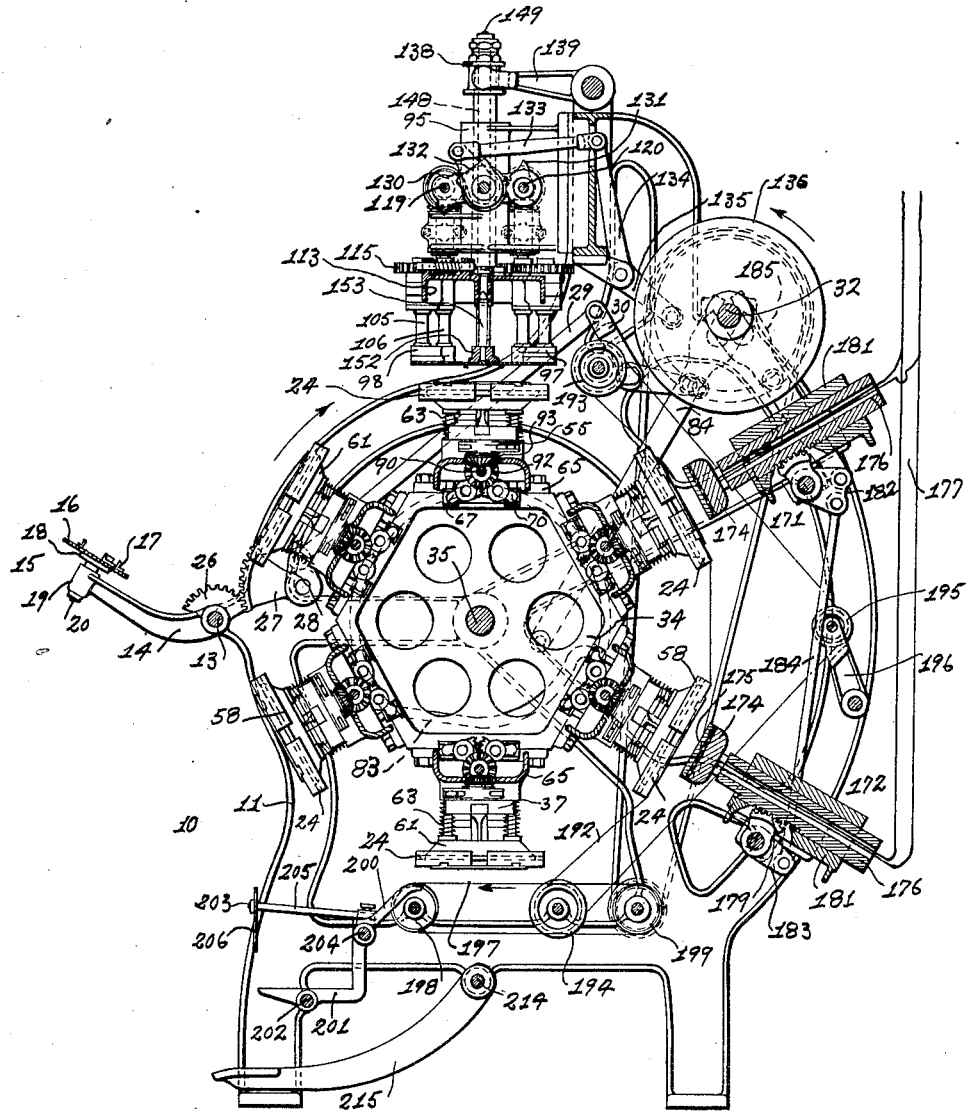

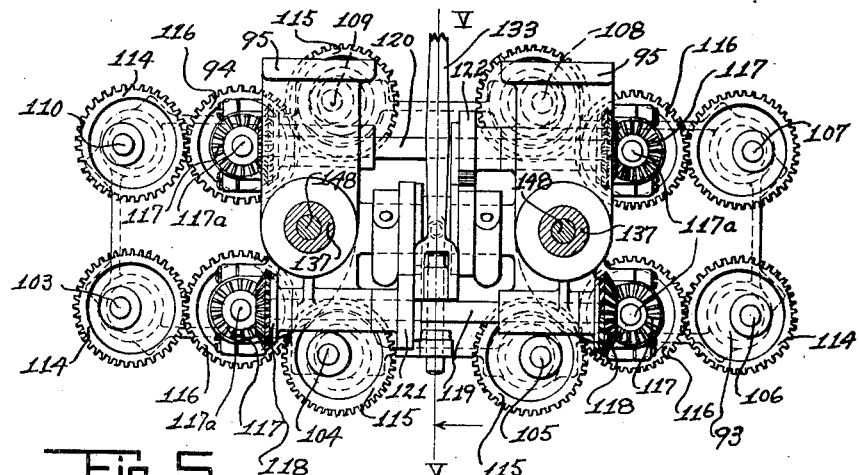

B. W. TUCKER.
MACHINE FOR FOLDING COLLARS, &c.
APPLICATION FILED JULY 29, 1908.

1,086,420.

Patented Feb. 10, 1914.
15 SHEETS—SHEET 5.

Witnesses
A. Becker.
A. Redmond.

Inventor
Benjamin W. Tucker
By his Attorneys
Criswell & Criswell

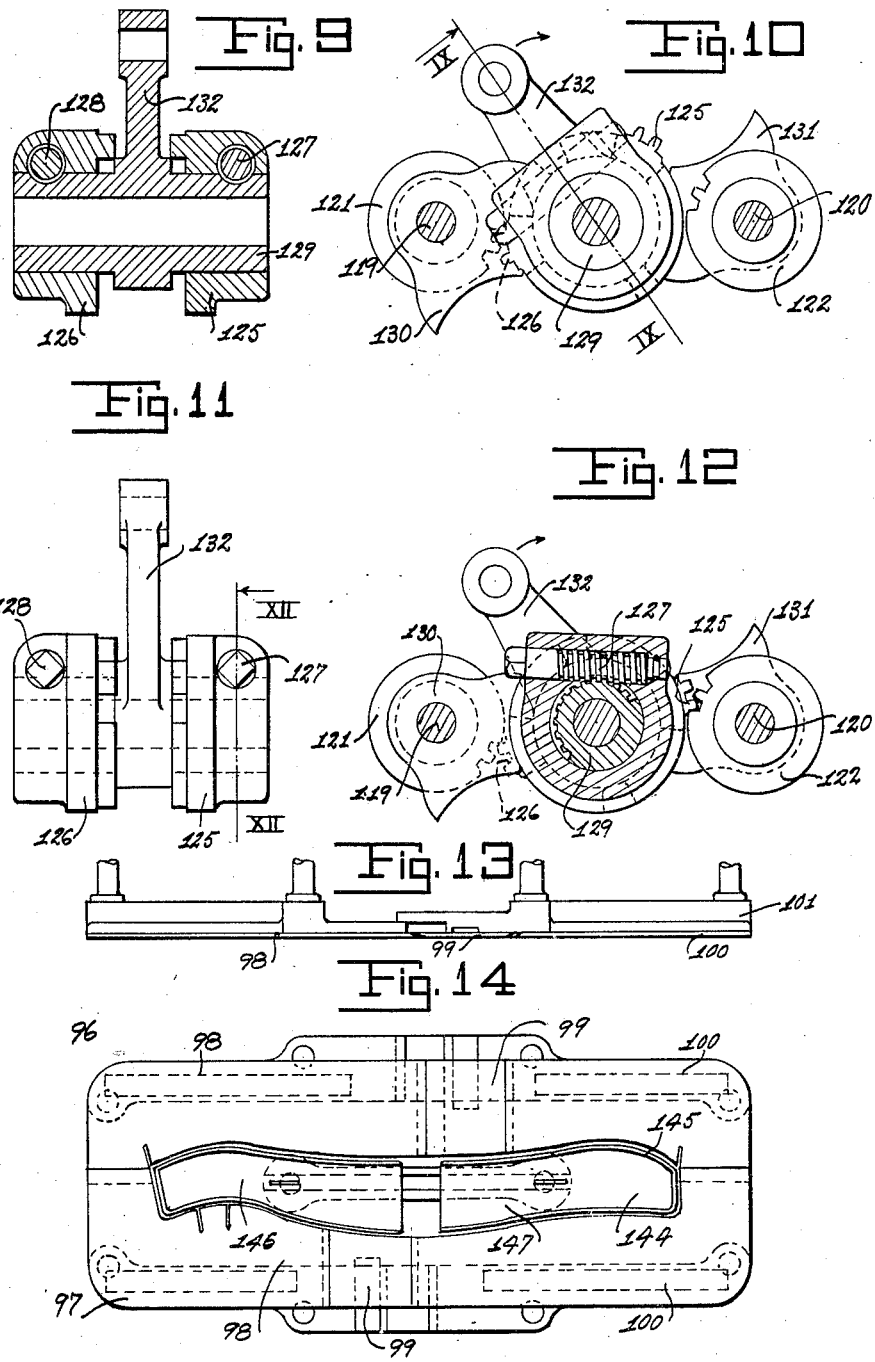

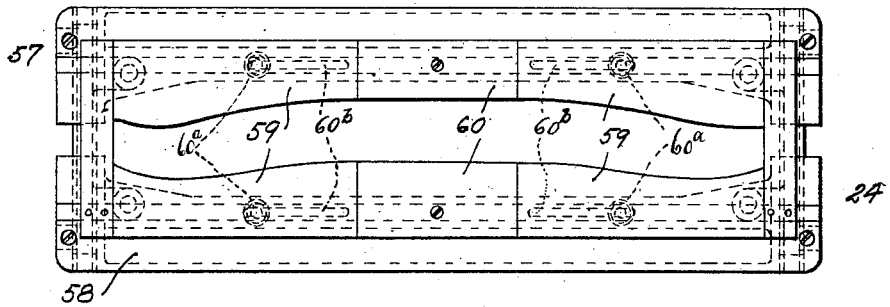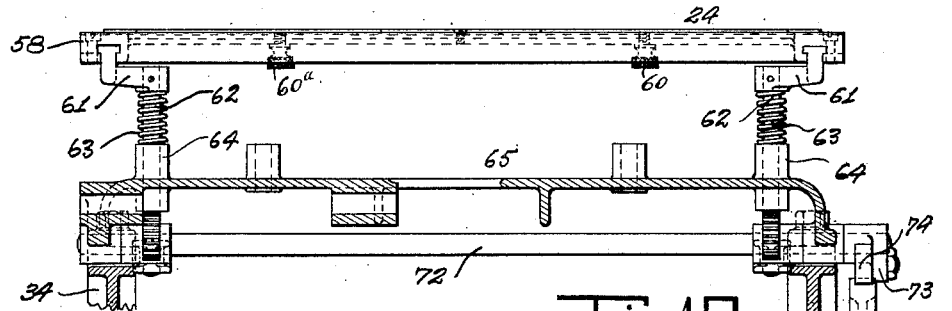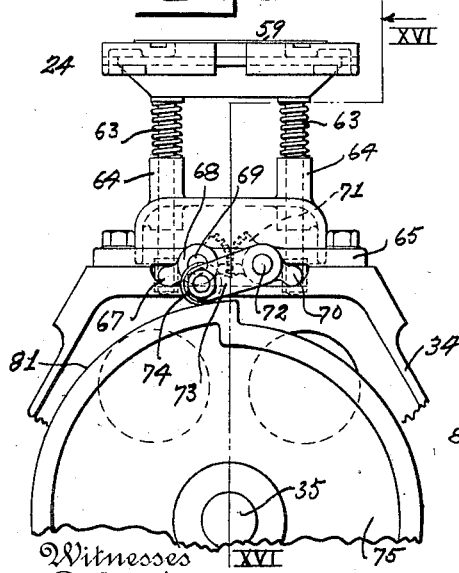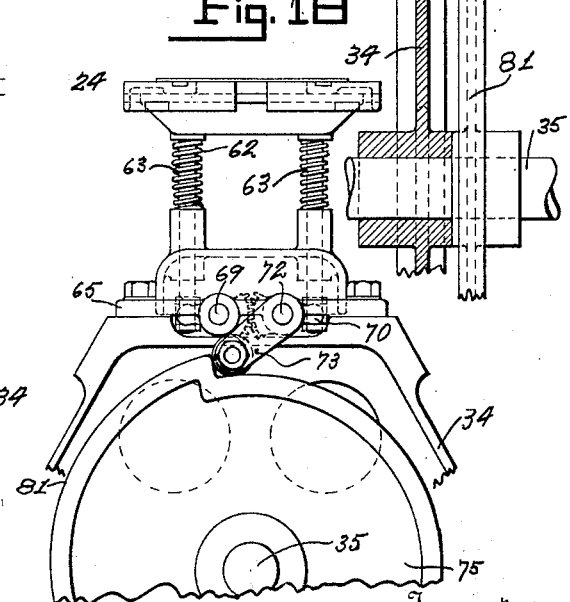

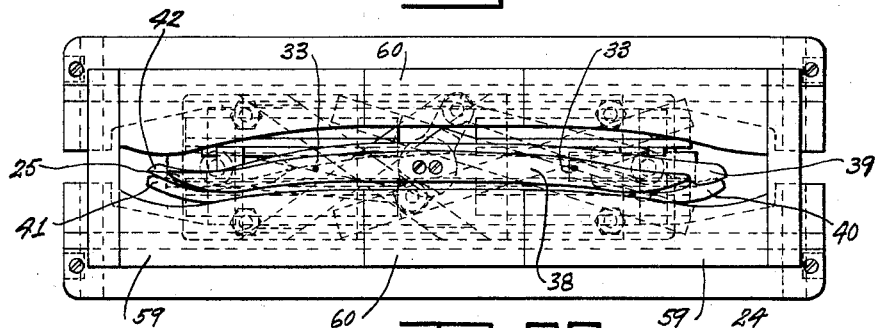
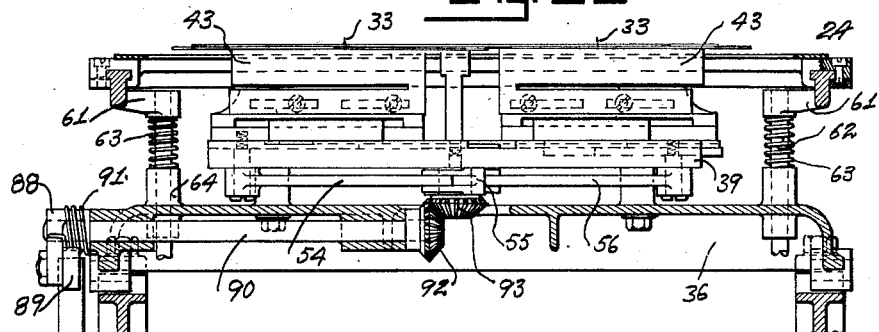
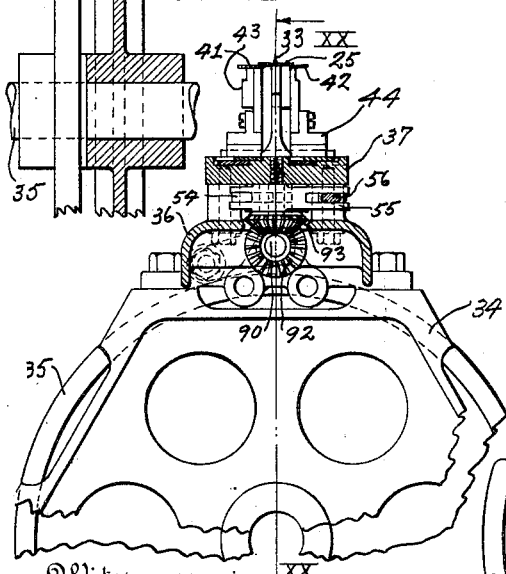
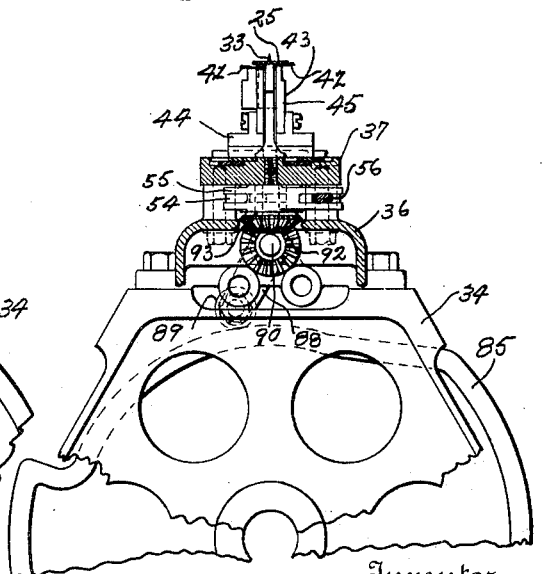

B. W. TUCKER.
MACHINE FOR FOLDING COLLARS, &c.
APPLICATION FILED JULY 29, 1908.
1,086,420.
Patented Feb. 10, 1914.
15 SHEETS—SHEET 9.
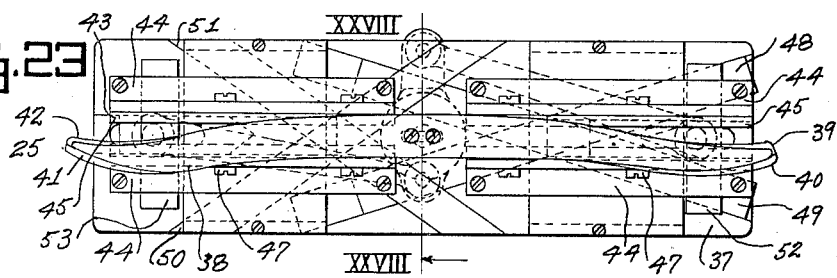
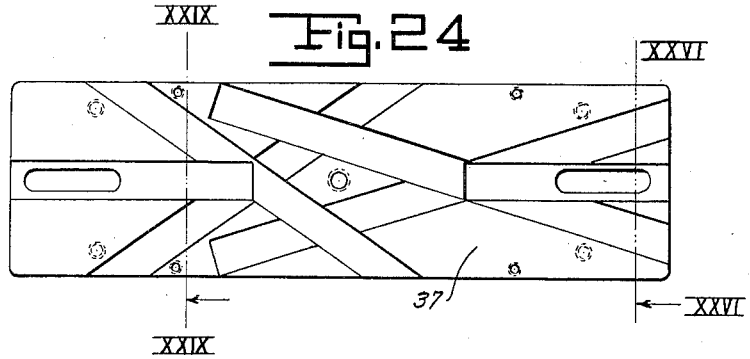
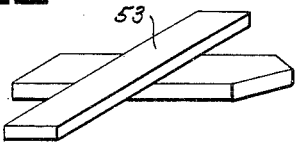
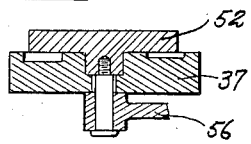
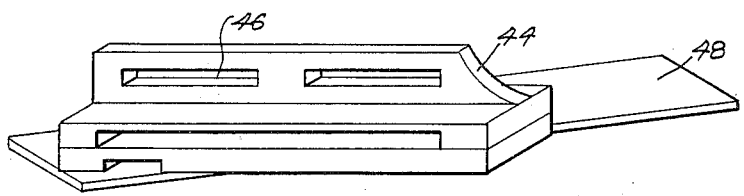
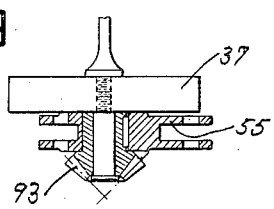
Witnesses
W. Becker.
A. Redmond.
Inventor
Benjamin W. Tucker
By his Attorneys
Criswell & Criswell
COLUMBIA PLANOGRAPH CO., WASHINGTON, D. C.

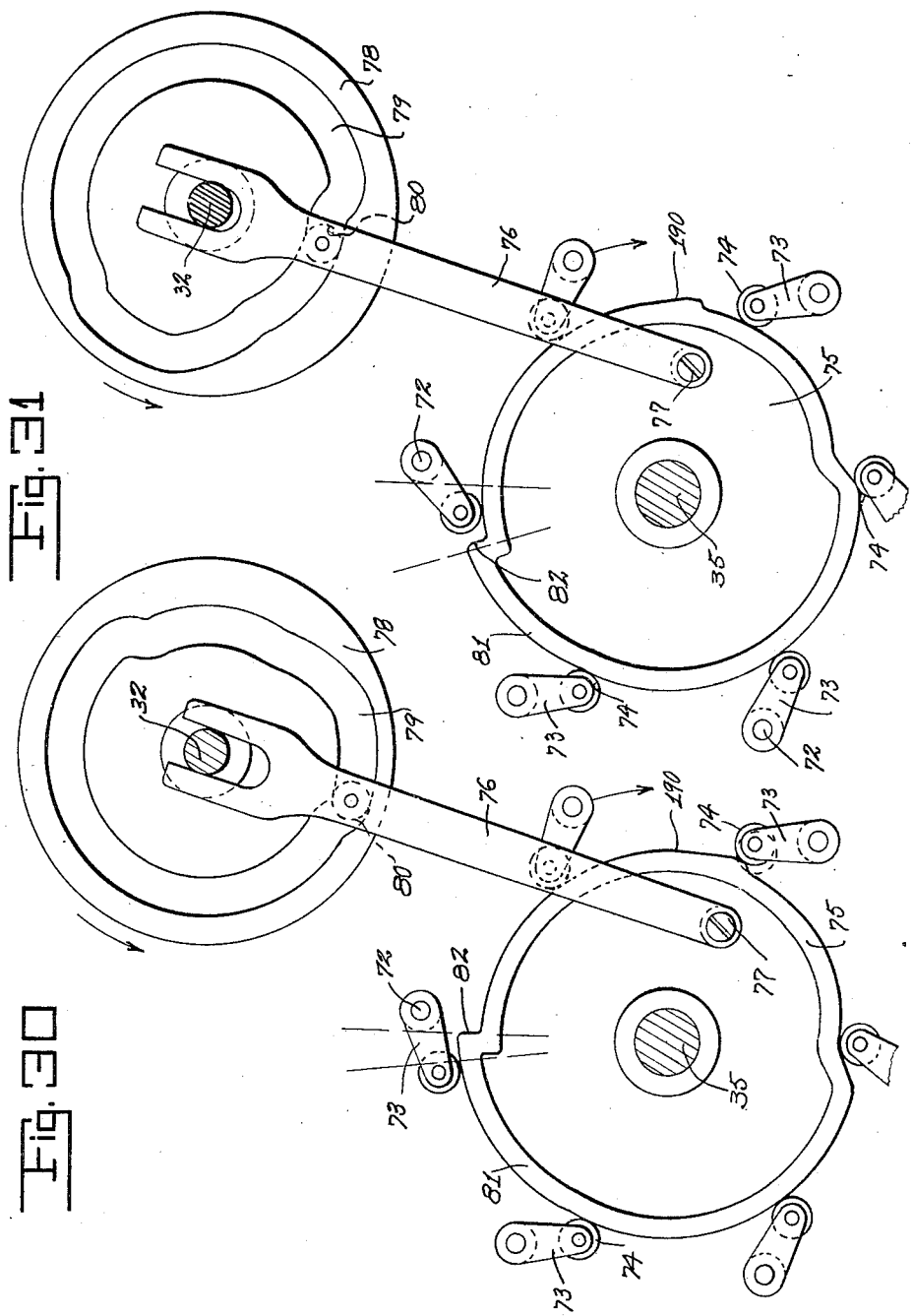

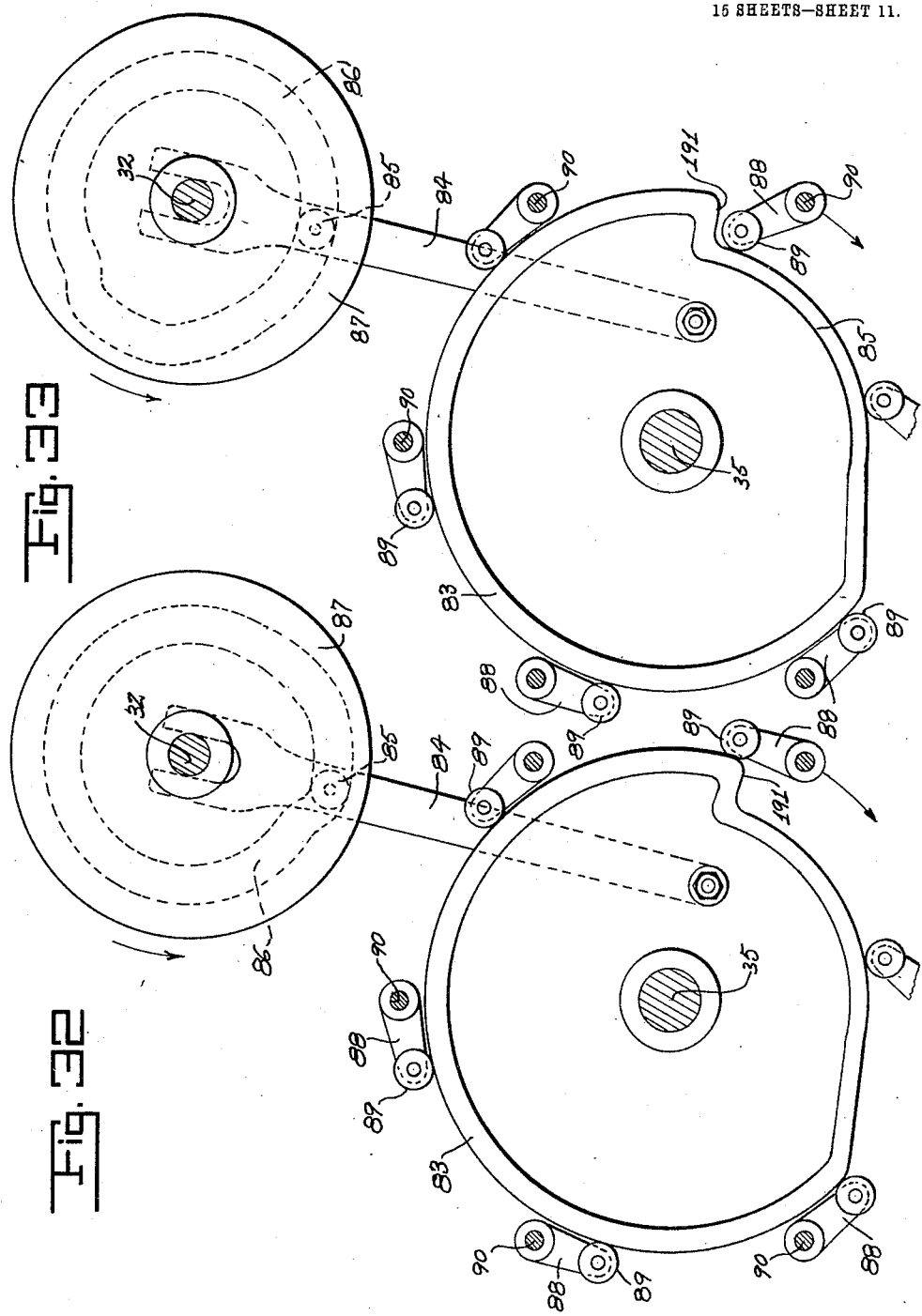

B. W. TUCKER.
MACHINE FOR FOLDING COLLARS, &c.
APPLICATION FILED JULY 29, 1908.
1,086,420.
Patented Feb. 10, 1914.
15 SHEETS—SHEET 12.
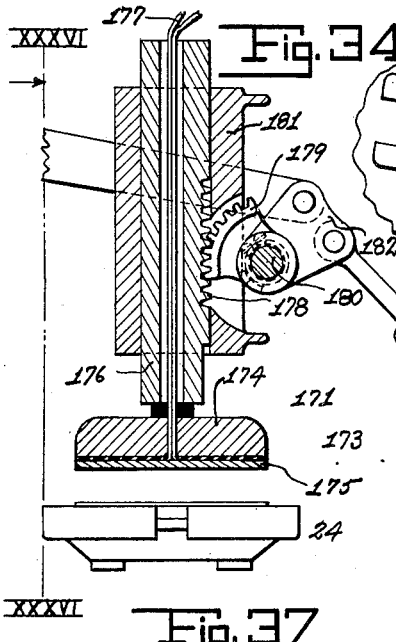
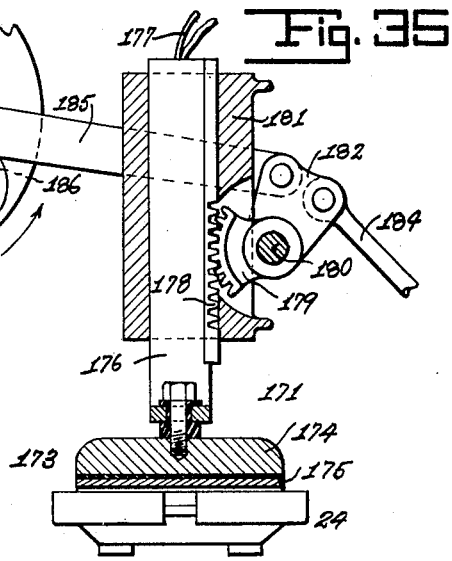
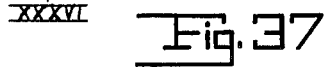
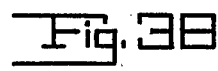
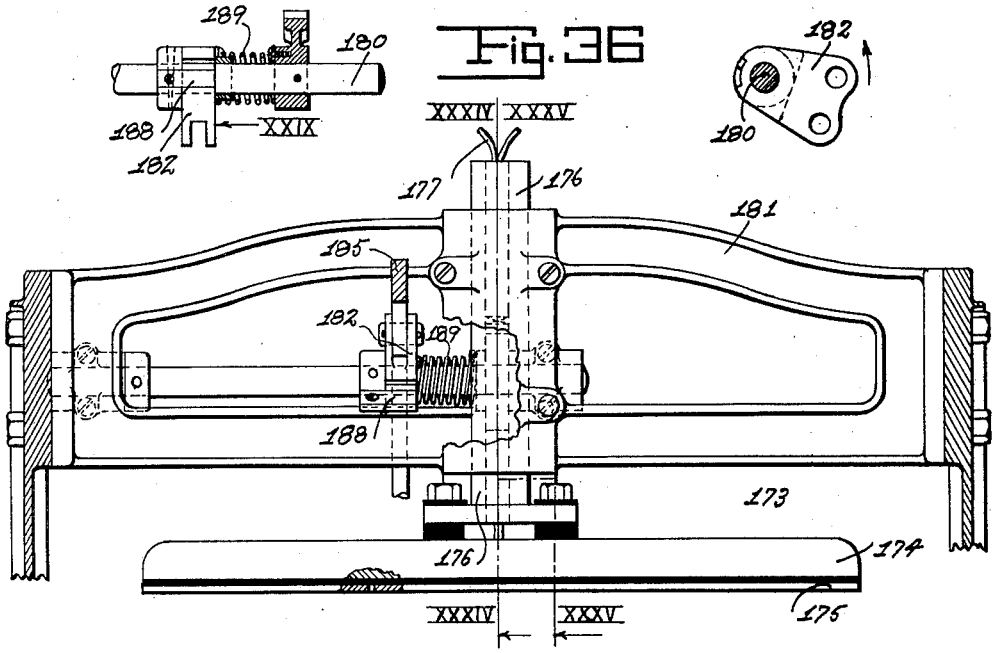
Witnesses
A. Becker.
A. Redmond
Inventor
Benjamin W. Tucker
By his Attorneys
Criswell & Criswell
COLUMBIA PLANOGRAPH CO., WASHINGTON, D. C.

B. W. TUCKER.
MACHINE FOR FOLDING COLLARS, &c.
APPLICATION FILED JULY 29, 1908.
1,086,420.
Patented Feb. 10, 1914.
15 SHEETS—SHEET 13.
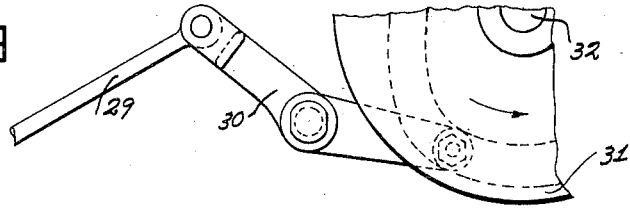
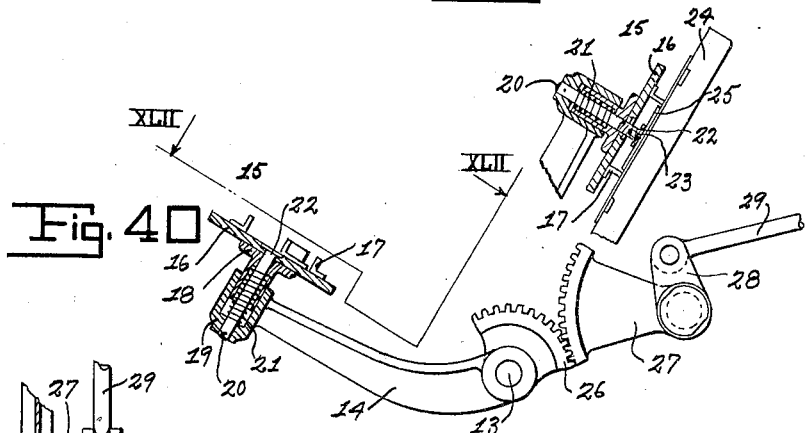
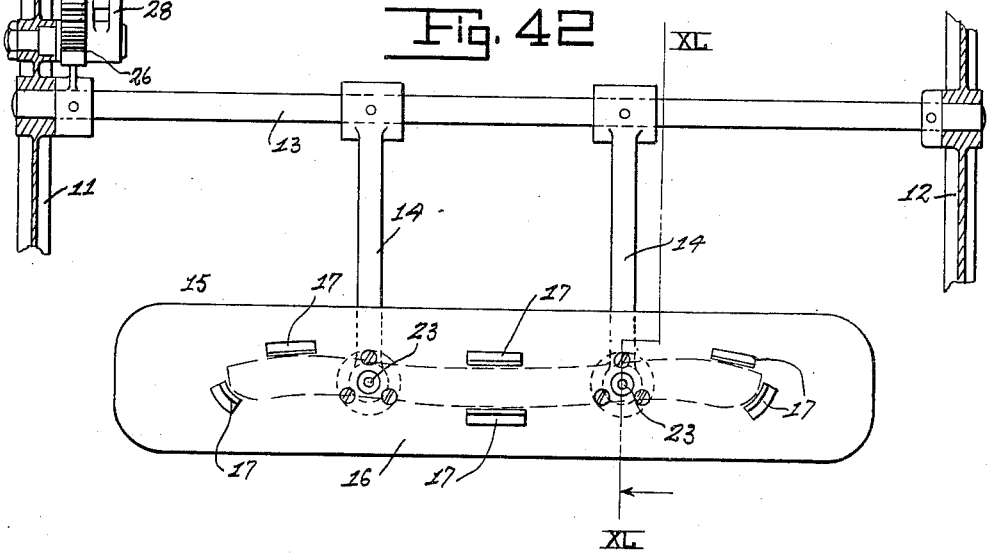
Witnesses
A. Becker.
A. Redmond.
Inventor
Benjamin W. Tucker
By his Attorneys
Criswell & Criswell

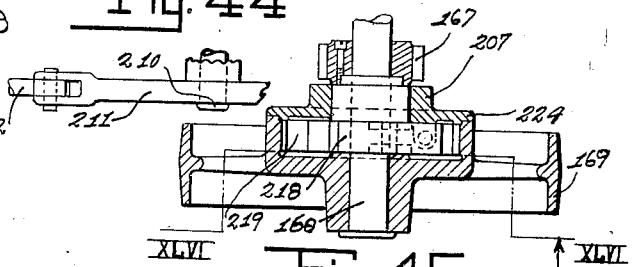
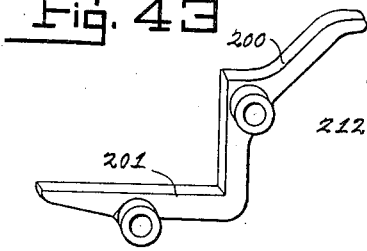
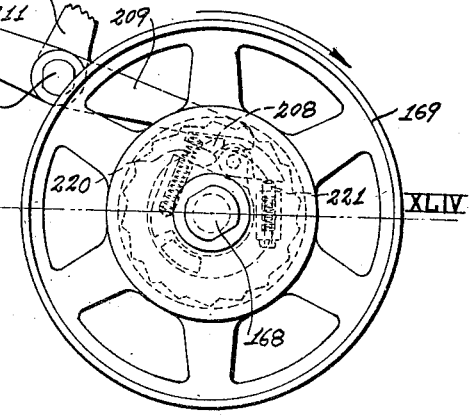
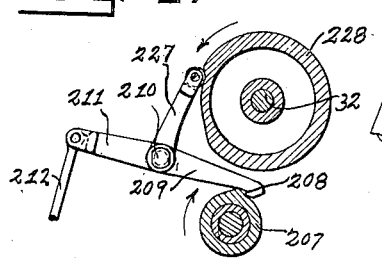
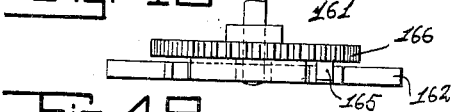
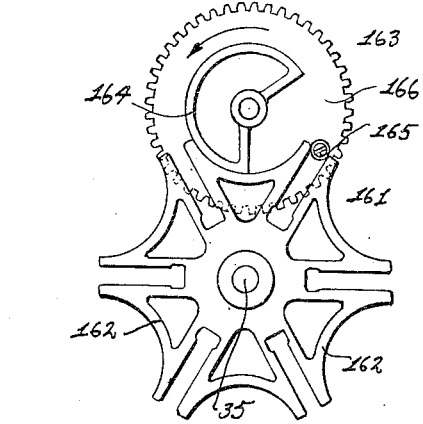
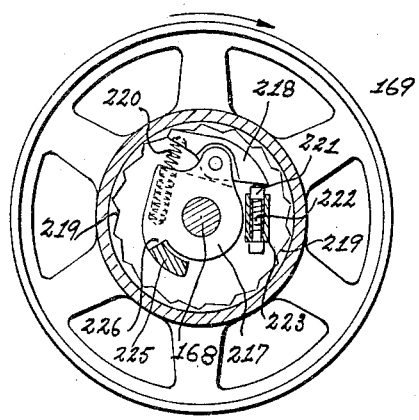

B. W. TUCKER.
MACHINE FOR FOLDING COLLARS, &c.
APPLICATION FILED JULY 29, 1908.

1,086,420.

Patented Feb. 10, 1914.

15 SHEETS—SHEET 15.

Witnesses
A. Becker
A. Redmond

Inventor
Benjamin W. Tucker
By his Attorneys
Criswell & Criswell

COLUMBIA PLANOGRAPH CO., WASHINGTON, D. C.

UNITED STATES PATENT OFFICE.

BENJAMIN W. TUCKER, OF SOUTH ORANGE, NEW JERSEY.

MACHINE FOR FOLDING COLLARS, &c.

1,086,420.	Specification of Letters Patent.	Patented Feb. 10, 1914.

Application filed July 29, 1908.   Serial No. 445,959.

*To all whom it may concern:*

Be it known that I, BENJAMIN W. TUCKER, a citizen of the United States, and a resident of South Orange, county of Essex, and State of New Jersey, have invented certain new and useful Improvements in Machines for Folding Collars, &c., of which the following is a full, clear, and exact description.

This invention relates more particularly to an automatic rotary machine for infolding the blanks of collars and cuffs.

The primary object of the invention is to provide a machine which is entirely automatic in its operation and in which a rotary drum is provided which carries the blank and during the operation of the machine, the said blank will be automatically infolded and properly creased and pressed and then automatically deposited upon a receiving device ready for removal without any handling whatever, except to place the blanks upon the receiving means provided therefor, thus materially lessening the time required for folding articles of the class described by the methods ordinarily employed and at the same time producing the best results without requiring the skill and accuracy of the attendant, as it is required by the usual method.

Other objects of the invention are to provide a simple and effective machine, which will be under the absolute control of the attendant so that it may be operated intermittently or continuously; to provide rotary means adapted to hold a plurality of blanks and simultaneously act upon the same to fold and crease the blanks; to provide simple and efficient means for heating and ironing blanks both while the templet is still within the folded blank and after the templet has been contracted and removed; to provide simple and efficient means for infolding the blank and confining the same in its folded position during the movement of the parts; and to provide simple and efficient mechanism for operating and timing the several parts of the invention.

A further object of the invention is to provide means whereby independent devices for heating and pressing the folded blank may be employed; to provide means which will engage and hold the blanks while being pressed, and to provide means to receive the folded blanks properly stacked ready for removal.

Figure 8:
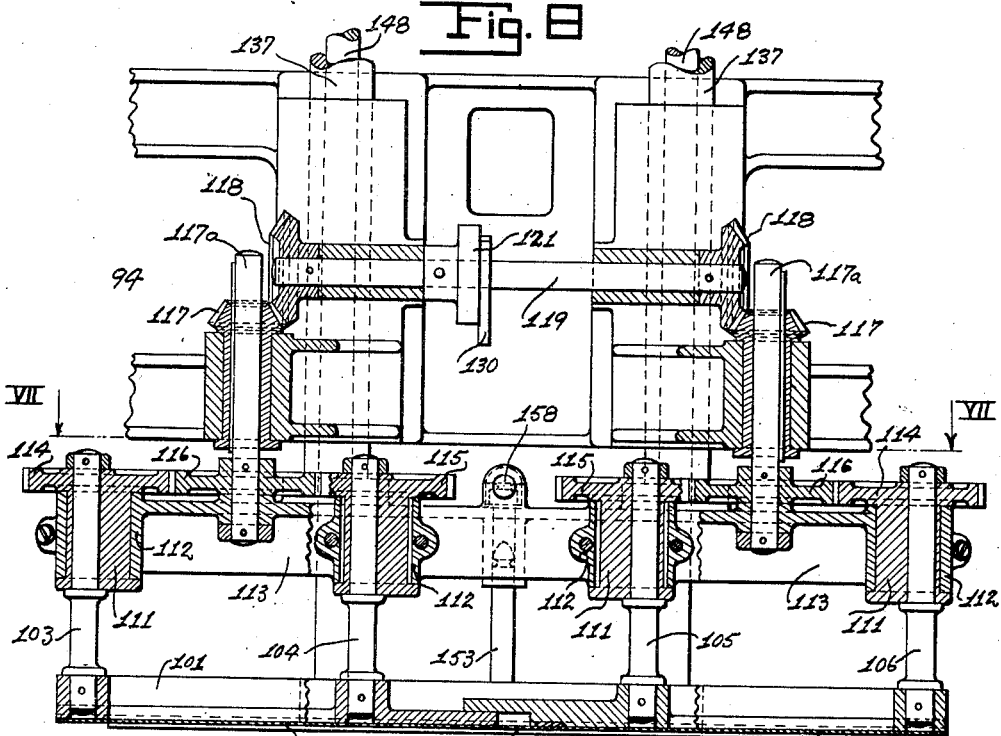
Figure 50:

In the drawings, Figure 1 is a side elevation of one form of machine embodying my invention. Fig. 1ª is a vertical section showing a part of the mechanism for moving the infolders vertically. Fig. 2 is a front elevation. Fig. 3 is a vertical section, partly in elevation, taken on the line III—III of Fig. 2. Fig. 4 is a plan view, partly in section, of the means for operating the infolders. Fig. 5 is a vertical section, partly in elevation, of the upper part of the machine taken on the line V—V of Fig. 4. Fig. 6 is a view similar to Fig. 5 showing a little more of the operating mechanism for the infolders, and also certain of the parts in section, the position of the parts being such that the blank has been folded about the templet. Fig. 7 is a sectional plan view taken on the line VII—VII of Fig. 8. Fig. 8 is a vertical section, partly in elevation, taken on the line VIII—VIII of Fig. 7. Fig. 9 is a section, taken on the line IX—IX of Fig. 10, showing a part of the mechanism for adjusting the operating means of the infolders to vary their relative movements. Fig. 10 is a section, partly in elevation, showing the operating mechanism for the infolders. Fig. 11 is a detail elevation of the mechanism shown in Figs. 9 and 10. Fig. 12 is a section taken on the line XII—XII of Fig. 11, showing the operating mechanism for the infolders in a different position, so that the infolders will work in unison instead of one being moved in advance of the other. Fig. 13 is a fragmentary front elevation of the infolders. Fig. 14 is an inverted plan view of the infolders and inner folding element or member for folding the blank ready for the infolders to act. Fig. 15 is a detail plan view of the table or platen, which coöperates with the templet and infolders while the blank is being infolded, and also with the heating and pressing device. Fig. 16 is a front elevation, partly in section, of the platen and mechanism therefor. Figs. 17 and 18 are views of the operating mechanism for raising and lowering the platen, the parts being shown in different positions. Fig. 19 is a detail plan view of one of the templets. Fig. 20 is a front elevation, partly in section, of the templet and operating mechanism therefor. Figs. 21 and 22 are vertical sections, partly in elevation, of one of the templets and mechanism for operating the same. Fig. 23 is a detail view of one of the templets showing the templet plates contracted or collapsed. Fig. 24 is a view of the guiding templet bed or member. Fig. 25 is a detail perspective view of a part of the templet mechanism. Fig. 26 is a section taken on the line XXVI—XXVI of Fig. 24. Fig. 27 is a detail perspective view of a part of the adjustable means for the templet plates. Fig. 28 is a transverse section, partly in elevation, taken on the line XXVIII—XXVIII of Fig. 23. Fig. 29 is a transverse section through the templet bed taken on the line XXIX—XXIX of Fig. 24. Figs. 30 and 31 are detail views, partly diagrammatic, showing different positions of the cam and operating means therefor, to cause the platen to be raised and lowered. Figs. 32 and 33 are detail views, partly diagrammatic, showing different positions of the cam which expands or contracts the templet plates or members. Fig. 34 is a vertical section, partly in elevation, of the means for heating and pressing the blank after being folded, showing the platen which coöperates therewith in elevation, the section being taken on the line XXXIV—XXXIV of Fig. 36. Fig. 35 is a view similar to Fig. 34 except that the section is taken on the line XXXV—XXXV of Fig. 36, and the parts are shown in different relative positions. Fig. 36 is a transverse section through the machine frame, showing the heating and pressing device and means for operating the same. Figs. 37 and 38 are details, partly in section and partly in elevation, of the operating mechanism of the heating and ironing devices. Fig. 39 shows a part of the mechanism for operating the receiver or holder for the blanks before being folded. Fig. 40 is a section, partly in elevation, of the receiver or holder for the blanks. Fig. 41 is a detail view showing the receiver in position for delivering one of the blanks to be folded to one of the templets. Fig. 42 is a fragmentary plan view of the blank receiver or device and a part of the operating mechanism therefor. Fig. 43 is a detail view of one of the fingers and guides of the grid forming a hopper or stacker for the blanks after the same has been folded and on which the blanks are deposited. Figs. 44 to 47 are views of a form of clutch that may be used in connection with the machine to adapt the same to be stopped intermittently. Figs. 48 and 49 are plan and side elevations respectively of the mechanism for intermittently moving the templets; and Figs. 50 to 57 are partly diagrammatic views showing the different steps during the folding of one of the blanks.

While I have shown a machine in which a plurality of templets are employed and which form a part of a drum and are adapted to move about an axis, it will be understood that a single or a plurality of templets may be employed and moved other than in a circular direction; that some of the parts may be used in connection with other machines for folding collars and the like; and that various changes in the arrangement and construction of the parts may be made without departing from the character of the invention.

The frame 10 of the machine may comprise two side members 11 and 12 which are suitably braced so as to properly support the several features of the invention, and arranged on the frame between the sides thereof is a shaft 13 from which project the arms 14 on the outer ends of which is arranged a receiver or device 15 as shown in Figs. 1, 2, 3, and 40 to 42. The blanks, comprising one or more layers as usual, are placed upon the receiver table 16 between the guides 17 so as to be positioned and supported thereon, and secured to the receiver table 16 are a plurality of sleeves 18, which are slidably held in the bosses 19 carried by the arms 14. A rod 20 is secured to each boss and around the rod is a spring 21 which is interposed between the sleeve 18 and the boss 19 so as to yieldingly hold the receiver or device to the arms 14, and on the end of the rod 20 is an enlarged part or collar 22 in which is an opening 23, so that when the arms 14 are forced over from the position shown in Figs. 1 and 40 to that shown in Fig. 41 the guides 17 will engage a part of a platen or table 24 and will hold the receiver 16 stationary and permit the rods 20 to force the blank outward, between the guides 17 and deliver the same on to one of the templets 25 owing to the continued inward movement of the arms 14 as will be presently described.

The arms 14 and the table 16 may be moved in any suitable way. As shown a segment 26, Figs. 39 and 40, is secured to the shaft 13 and in mesh with this segment is another segment 27 which is connected to operate with an arm 28. This arm 28 is connected to a rod 29 at one end and the opposite end of said rod 29 is connected to a lever 30 which is operated by means of a cam 31 secured to the drive shaft 32, so that as the drive shaft is operated the lever 30 through the rod 29 will move the table 16 from the position shown in Figs. 1 and 40 to the position shown in Fig. 41 to deliver the blanks on to one of the templets 25 so as to force the blank over the needles 33 carried by each templet, the said needles being adapted to enter the openings 23 and serve to hold the blanks in position on to the templets.

Instead of a single templet, as in the ordinary form of machine, I employ a plurality of templets and move the same in any suitable way and form each templet so that the plates or members thereof may be contracted or expanded in any desired manner. As shown six templets are provided, though this number may vary, and said templets are formed as a part of a rotary drum or turret 34 which is held to rotate with the shaft 35. Each templet may be similarly made and operated and each may comprise a support 36 which has a guiding bed, plate or member 37 of the usual or any preferred construction, and which is adapted to have suitable templet plates movable thereon which define the shape of the article to be folded. As shown, Figs. 19 to 29, a plate 38 of thin metal, from which project the needles 33, is secured to the plate or member 37 of the support 36, and arranged so as to move relatively thereto are a plurality of plates 39, 40, 41 and 42 forming a part of the templet 25. These latter plates are also of thin material, and are each secured to a slide 43 which may comprise two members 44 and 45 and which are adjustable relatively to each other by means of the slots 46 and screws or bolts 47 so that the movable members of the templet or former may be lengthened or shortened according to the length of the collar or other article to be made, the shape of the plates being varied according to the nature of the article to be folded. The member 44 of the templet plate 39 is secured to a diagonally movable plate, block or slide 48; the member 44 of the plate 40 to a block or slide 49; the member 44 of the plate 41 to a slide or block 50, and the member 44 of the plate 42 of the templet to a slide or block 51. The slides or blocks of the several templet plates, intersect each other in pairs, and are movable one above the other, and blocks 48 and 49 are connected by the transverse or cross-bar 52 to work in unison, while the blocks 50 and 51 are connected by the transverse bar 53 to cause said blocks to move in unison and either inwardly or outwardly to contract or expand the templet plates as is usual in machines of this character. The transverse bars fit grooves in the slides or blocks to permit them to move relatively to each other, and the transverse bar 53 is connected by a link 54 to one end of a lever 55, and the other end of said lever is connected by a link 56 to the transverse bar 52, and said lever 55 is located under the plate or member 37, and when said lever is moved in one direction it will expand the templet plates and in the other direction will contract or collapse the same, the templets and adjusting means described being of the usual or of any preferred construction.

The table or platen 24, one for each templet, coöperates therewith and forms a part of the drum 34 and each platen comprises two members 57 and 58 which are adjustable to or from each other, and each member may comprise two plates 59 and an intermediate plate 60 whereby the latter may be removed and a plate of different size substituted therefor, so that the plates or members 59 may be adjusted to or from each other, the said adjustment of the plates 59 being secured by means of thumb nuts 60$^a$ the stems of which pass through slots 60$^b$ in the members 57 and 58, thus permitting the parts of the platen to be adjusted transversely and lengthwise to adapt the same to different sizes of collar blanks and the like and to vary the size of the opening formed between the members of the platen according to the size of the templet used, and also that the inner edges of the members or plates of the platen may engage those of the collar which has been infolded as will be hereafter explained.

The platen is supported by means of the arms 61, Figs. 15 to 18, and these arms are held to vertically movable rods 62 around which are the springs 63, and these springs 63 are interposed between the arms 61 and the bosses 64 of the support 36 which is rigidly held so as to form a part of the drum 34. The rods 62 are provided with an enlarged lower end and are arranged in pairs, and one pair is operated by the ends 67 of levers 68 which are secured to the shaft 69, and the other pair are operated by the ends 70 of levers 71 which are secured to the shaft 72 arranged parallel to the shaft 69. The ends of the rods are enlarged for proper engagement with the ends of said levers 68 and 71 and these levers at their inner ends are provided with teeth forming segments which intermesh. To each shaft 72 is secured an arm 73 and on this arm is a roller 74 which is adapted to travel around the periphery of a cam 75. The cam 75 has a movement on the drum shaft 35 but is not fixed to rotate therewith, and said cam has its surface so arranged that as the arms rotate around the same the said cam during such movement and by reason of a relative movement of its own, as will be presently explained, will cause the arms to shift their positions and through said arms and the levers 68 and 71 lower the platen, the normal action of the springs 63 being to force the platen outwardly. The independent movement of the cam 75, Figs. 30 and 31, is secured through an arm or lever 76 which is held at 77 to the cam, and has its other end slotted so as to be guided by the drive shaft 32, and on the shaft 32 is a cam 78 which has its cam groove 79 so formed that it will cause a reciprocatory movement to be imparted to the arm 76, the said arm 76 being provided with a roller 80 or other engaging means adapted to travel in the groove of the cam 78. The cam 75 is provided with a raised part 81 to cause an inward movement of each platen relatively to its templet as the arms for moving the rods 62 travel around the cam 75, and said cam is provided with a cut-away part 82 or jog whereby each platen may be forced outwardly by the springs 63 when the cam 75 is given an independent movement on the drum shaft 35 through the arm or lever 76. By this means the cam 75 may be so formed that it will permit the arms 73 to move inward or outward while the drum remains stationary in order that the blank may be properly acted on and the platen made to coöperate properly with the templets, the infolders, and other parts, as will be more fully hereinafter explained.

The cam 75 is located on the shaft 35 at one side of the machine and on the other side of the machine is a cam 83 which is adapted to operate the templet plates to contract or expand the same. This cam 83 is held on the shaft 35 so as to be shifted relatively thereon in the same manner as the cam 75 and secured to the cam 83 is an arm or lever 84 which carries a roller, as at 85, which is adapted to travel in the cam groove 86 of a cam 87, the latter being secured to the shaft 32 so that as said cam 87 is rotated the cam 83 will be given an independent movement around the shaft 35. A plurality of arms 88 carrying rollers 89 and held to the shafts 90, one for each templet, are arranged to move around the periphery of the cam 83, and said arms are normally forced inward by the springs 91, Figs. 2 and 20, against the action of cam 83. The shafts 90 are each provided on its inner end with a bevel gear 92, and this gear is in mesh with a similar bevel gear 93 held to the lever or arm 55 so that said lever may be operated and through the links 54 and 56 contract or expand the plates forming the templet.

Each templet is provided with one or more of the needles 33 which are adapted to enter the blanks when the same are carried forward and inward by the receiving device 15, and by reason of the action of the rods 20 the blanks will be forced from the table 16 and will remain upon the templet. As the templets revolve through the rotary movement of the drum, which latter is intermittently operated corresponding to the distance between any two templets, and as soon as a templet has received a blank from the device 15, the drum will be given a movement to place the blank under the infolding mechanism 94. This mechanism 94 may be variously constructed. As shown a single infolder means is used for the several templets and said mechanism is arranged in the upper part of the machine frame and is supported on a bracket 95 of said frame and is movable to and from each templet as the latter are successively placed in position with the blank to be folded under the same. The infolder mechanism comprises two main members or infolders 96 and 97, Figs. 4 to 8 and 13 and 14, and these infolder plates or members may comprise a plurality of parts as 98, 99 and 100. The part 99 is adapted to be made of any suitable size to adapt the infolder plates or members for different sizes of collars and cuffs as is usual, and said members are cut away at their inner edges and opposed so as to engage the blank to infold the inner edge thereof under the templet plates or members, the parts of one plate or member of the infolder being adjustably held to a block or head 101 and the parts of the other member to a head or block 102. The head 101 of the infolder mechanism is supported by the rotary shafts or studs 103 and 104 at one end and by the studs or shafts 105 and 106 at the other end, while the head or block 102 is supported and carried by the shafts 107 and 108 at one end and at the other end by the studs or shafts 109 and 110. Each stud or shaft is eccentrically held to a part or disk 111 which is located and movably held in a boss 112 formed as a part of the infolder frame head 113. As the parts 111 are rotated the shafts 103 to 110 will be given an eccentric movement and during such movement will force the heads 101 and 102 toward or from each other so as to cause the infolder plates to move inwardly or outwardly according to the direction of movement of said parts 111. The parts 111, and the shafts connected therewith for operating the infolder plates, are arranged in pairs, each pair being operated by gears 114 and 115 which are secured to or formed integral with the parts or extensions 111, and said gears 114 and 115 are operated by an intermediate gear 116. The intermediate gears 116 are each operated through a bevel gear 117 by a shaft 117ª having a key and slot connection with the bevel gear 117 to permit vertical movement of said shaft, and said bevel gears are each in mesh with a second bevel gear 118 located on each end of transversely-extending shafts 119 and 120 at the front and at the rear of the machine. The shaft 120 through the gears 117 and 118 operates the rear infolding plate while the shaft 119 operates the forward infolder plate and moves said infolder plates inwardly or outwardly according to the direction of movement of said shafts.

The infolder operating shafts 119 and 120 may be rotated in unison so that the infolder plates will move together or they may be moved one in advance of the other as preferred. To effect this I secure to the shaft 119, Figs. 4 to 12, a toothed wheel or disk 121 and to the shaft 120 a toothed wheel or disk 122. The wheel 122 is adapted to mesh with a segmental gear 125 and the wheel 121 with the segmental gear 126. The gears 126 and 125 are relatively movable with respect to each other by means of the screws 127 and 128 which are adapted to engage teeth on the periphery of a drum 129.

The screw 127 when rotated will move the gear 125, while the screw 128 will move the gear 126 around the toothed drum 129, and in this way will cause the segmental gears to simultaneously engage the teeth of the wheels 122 and 121 to rotate the same in unison as shown in Fig. 12, but when said gears 125 and 126 are moved relatively with respect to each other the said gears will operate the wheels one in advance of the other as shown in Fig. 10, so that the infolder plates may be made to move in unison or one in advance of the other as desired. To the shaft 119 is held a locking element or foot 130, and to the shaft 120 is held a locking element or foot 131. Each element or foot is provided with curved or recessed portions corresponding to the periphery of a part of the segmental gears 125 and 126, and are adapted, after the shafts 119 and 120 have been rotated, to hold the same and properly position the infolder plates, the segmental gears being cut away to permit proper movement of the locking elements. An arm 132 is secured to the drum member 129 of the adjusting means and this arm is connected by a link 133, Fig. 6, to one end of a lever 134. The arm 135 of the lever 134 is provided with a roll or other engaging means which is movable in the groove of a cam 136 secured to the drive shaft 32, so that as said shaft rotates the lever 134 through the link 133 and arm 132 will open and close the infolder plates at the proper time and in unison or in advance of each other as preferred.

The infolder plates have a vertical movement toward and from the templet plates, and from the infolder frame head 113 project one or more sleeves 137. These sleeves 137 are slidingly held in the bracket 95 in which the shafts 119 and 120 are journaled, and on the upper end of said sleeves are arranged collars 138 which are engaged by the forked ends of arms 139. The arms 139 are secured to a shaft 140, Figs. 1ª and 6, journaled in the upper part of the machine frame, and to said shaft is held an arm 141 which is operated by a lever 142 by means of a cam 143 located on the shaft 32, so that as said shaft is operated the infolder frame head 113, together with the infolding plates and means supported thereby, will be moved toward or from the templets as they are successively presented under the same, the shafts 117ª of the intermediate gears 116 being provided with a suitable connection with the gears 117 to permit this vertical movement.

A matrix or folding element 144 is movable with the infolder frame head 113, and this element or member is independently movable of the infolder plates. The element 144 is provided with pendent flanges 145 corresponding in form and structure to the templet plates and may comprise a plurality of members as 146 and 147, Fig. 14, which are adjustably held together to adapt the same for different sizes of collars or the like, and said element is held to the rods 148 which project upwardly through the sleeves 137 and at the upper end thereof are each provided with a stem 149 around each of which is arranged a spring 150. The spring 150, Fig. 6, is confined between the ends of each rod 148 and a collar or nut 151 and serves to yieldingly hold the element 144 to the sleeves 137 and the infolder frame head 113. The purpose of the element 144 is to fold the blanks about the edges of the templet plates when the latter are in an expanded position and as the infolders are moved downwardly, and to hold the blank while the infolders are forcing the lower edge of the blank under the templet plates. In this position the platen moves upward before the withdrawal of the infolders so as to prevent the withdrawal of the inturned edges of the blank and as soon as the infolders are withdrawn from under the templet the said platen or table is moved far enough to grasp the infolded edge of the blank between the templet and platen and hold the same as the infolder head and the element 144 and infolder plates are raised leaving the blank folded about the templet.

If for any reason the element 144 should be in the way for any purpose whatever, the said element may be held in a raised position. As shown a casting 152 is held to the element 144 and projecting outwardly from the collar is a rod 153. The upper end of this rod 153 is grooved, as at 154, and is movably held in the opening 155 in a boss 156 projecting downward from the infolder frame head 113. A finger 157 is adapted to engage the groove 154 after the element 144 has been raised far enough for this purpose, and said finger is normally forced into engaging position by means of a rod 158. The rod 158 is slidingly held in lugs on the infolder frame head 113 and is normally forced in one direction by a spring 159. As will be seen, when the element 144 is raised, the finger 157 will engage the groove 154 and hold the same elevated, and when the rod is forced against the spring 159, as by pressing against the part 160, the element 144 may be again lowered to coöperate with the infolding members or plates for folding the collar blanks.

The drum with its templet, after having the blank folded about the same, is given a partial rotation to present a new blank to be folded and which has been received from the receiver 15 in position to be folded about the templet, and the one previously folded is moved to a position to have the blank properly heated and pressed or ironed. The rotary movement of the drum may be accomplished in various ways. As shown in Figs. 1, 48 and 49 the drum shaft 35 is operated by a form of Geneva movement 161 which has one element, as a slotted wheel 162, secured to the drum shaft 35 and a second element 163. This element 163 comprises a locking disk 164 and an operating part 165 carried by the gear 166, so that at each complete rotary movement of the gear 166 a partial rotation will be given the shaft 35 according to the form of the element 162 and the number of templets carried by the drum. The gear 166 is in mesh with a pinion 167 carried by the shaft 168 on which shaft is the main drive pulley 169, the said pinion 167 serving also as a driving means for the gear 170 of the drive shaft 32.

The folded blank while still held by the templet plates and after the drum is moved a part of rotation, is presented opposite the face of a heating and ironing device 171. There may be a plurality of heating and pressing devices and the device 171 may form the initial pressing or ironing means while the device 172 at the next movement of the drum serves to complete the pressing of the blank, though there may be only one ironing device employed, or more than two, if desired. The ironing or pressing devices are substantially the same in construction and each comprises a head 173 which may consist of two members 174 and 175, which may be insulated from each other and both suitably supported by a sleeve or element 176 so as to be insulated therefrom. Each sleeve or element 176 is provided with an opening therethrough for electric connections, as 177, which are connected to the member 175 to properly heat the same, said electric connections being connected with any suitable source of supply, though instead of the electric connections other means may be employed for heating the ironing and pressing head. The sleeve 176 is provided with gear teeth 178 at one side thereof to form a rack, and in mesh with said teeth is a segment 179, which is held to a shaft 180, the said shaft being supported in the bracket or frame 181 in which the sleeves or elements 176 are movably held. An arm 182 extends outward from the shaft 180 of the device 171, and an arm 183 is held to the shaft 180 of the ironing device 172. The arm 183, Fig. 3, is connected by a rod 184 to the arm 182, and a link 185 is connected at one end to the arm 182 and at its other end is forked to span the shaft 32. The link 185 has a roll 186, or other engaging means, which is movable in the groove of a cam 187 held to the shaft 32, so that as said shaft rotates the link 185 at the proper time will operate the arms 182 and 183 so as to force the devices 171 and 172 inwardly against the folded blank. Each of the arms 182 and 183 are held to its respective shaft to which the segments 179 are secured, and each arm is loosely held on its shaft 180 so as to have a limited independent movement through the bar 188, and each arm is connected by a spring 189 to its segment so that as said arms are moved each segment 179 and shaft connected therewith will be rotated by a yielding connection so that a proper pressure of the ironing or pressing devices may be given.

The device 171 presses the blank while the templet is in an expanded position and within the blank and while the platen holds the edges of the blank against the templet plates, the templet being collapsed or contracted after the initial pressing has taken place by the device 171 and before the ironing device 172 finally presses the blank. The platen is first given a movement to release the same from the blank in order that the templet may be contracted readily, and this slight movement is obtained after the drum with its blank has been moved opposite the ironing device 172 by means of the enlarged portion 190 of the cam 75 through the relative independent movement of said cam by means of the arm 76 and cam 78, while the templet is collapsed by the relative movement of the cam 85. This will cause the arm 88 of this templet to move inwardly or into the cutaway portion 191 of the cam 83, Figs. 32 and 33, thereby moving the plates together, the platen being again forced outward against the ironing device 172 as the latter is moved inward thereby completely pressing and ironing the blank.

As a means to assist in holding the blanks to the templets while being pressed by the ironing devices 171 and 172 a plurality of endless tapes 192 at one side of the machine are adapted to move with the templets after the blanks have been folded about the same. These tapes may be of any suitable number and pass around the pulleys 193 and 194 and around the tension roll 195. The latter roll or pulley, one for each tape, is carried by an arm 196 and the arms and the pulleys are suitably held on the machine frame. The belts or tapes 192 are so positioned with respect to the templet drum that the said tapes will be normally forced outward by the templets or the platen of each section, and by reason of frictional engagement therewith will move with the drum as the latter rotates.

When the blank has been pressed and ironed by the device 172 the drum is rotated by the mechanism 161 as previously described, and as the blank is free of the tapes 192 they will be deposited upon carrier belts 197. This is effected by the outward movement of the platen 24 through the action of the cam 83 and arms 88, which movement of the platen will force the blanks from the needles 33 of the templets as they are moved over the belts or carrier 197. There may be one or more belts 197, and said belts pass around pulleys 198 and 199, and in advance of the pulleys 198 are arranged fingers 200. A number of these fingers 200 may be provided so as to form substantially a continuous table for the blanks which pass to a holder or grid 201 and which may also comprise a plurality of sections each held to a shaft 202 and in parallel relation to provide a table on which the finished blanks may be stacked. A rod 203 extends across the machine at the front thereof and this rod is supported by means of rods 205 or otherwise, from the shaft 204 which carries the fingers 200 and said rod 203 is provided with two or more stops or plates 206 to cause the folded blanks to be properly deposited in the holder 201, a sufficient space being provided to permit a number of the folded blanks to be removed at a time and when desired.

It will be seen that all that is necessary for the attendant to do is to place the blanks to be folded on the table 16 of the device 15 and to start the machine in operation, after which the blank is automatically deposited upon a templet and each templet is successively presented to the infolding mechanism, and after being folded is automatically pressed and deposited in a holder properly stacked.

Any suitable mechanism may be employed for stopping and starting the machine, but I prefer to have the machine under the control of the attendant and at the same time permit the machine to be stopped only at certain points, that is, the templets in position to receive the blanks and the blanks in position to be properly folded and pressed. To do this I arrange on the shaft 168, on which is the main drive pulley 169, a clutch wheel or disk 207, which is movable independent of the shaft 168. This wheel or disk 207 is provided with a stop or tooth 208 and said stop is adapted to be engaged by a pawl 209 which is pivoted at 210 to the machine frame, on the outer end of which pawl is an arm 211 which is connected by a rod 212 to one end of an arm 213, Fig. 1, the said arm 213 being held to a shaft 214. To the shaft 214 is secured a treadle 215 which when depressed forces the pawl out of engagement with the stop or tooth 208 of the disk 207, the said pawl and treadle being normally forced in the opposite direction by means of a spring 216, Fig. 2, arranged on the shaft 214. A collar 217 is secured to the shaft 168 and this collar carries a pawl 218 which is adapted to engage the teeth 219 forming a part of the pulley 169, and carried by the collar 217 is a spring 220 which is arranged to force the pawl at the proper time into engagement with the teeth 219. The pawl 218 is pivoted to the collar 217 and has one end adapted to be engaged by a spring-pressed bolt 221. This bolt 221 is normally forced outward by the spring 222 which is of greater tension than the spring 220, and said bolt is arranged in a boss 223 carried by a disk 224, which is loosely arranged on the shaft 168 and to which is held the wheel 207. The spring 220 normally forces the pawl 218 into engagement with one of the teeth 219 of the belt pulley 169, the stop 225 carried by the disk 224 at this time engaging the projection or tooth 226 of the collar 217, and the pin or bolt 221 resting against a part of the pawl 218. When the pawl 209 engages the tooth 208 it will stop the disk 224 from rotating and will also stop the parts carried thereby. The pin or bolt 221 will now compress the spring 220 and will force the pawl 218 out of engagement with the teeth 219, allowing the pulley 169 to rotate independent of the drive shaft 168. An arm 227 is movable with the pawl 209 and this arm is engaged by a cam 228 arranged on the drive shaft 32. The cam 228 is arranged to hold the pawl 209 out of engagement with the tooth 208 so that when the treadle 215 is depressed the pawl 209 can not again engage the tooth 208 of the clutch until the templet on which is placed the blank to be folded is properly positioned under the infolding mechanism. By this means the machine while under the control of the attendant to operate intermittently or continuously cannot be stopped after once being started except at the point where the templets are moved to properly position the same, otherwise the machine might be stopped at different points of the rotation of the templet drum or turret.

Figure 51:
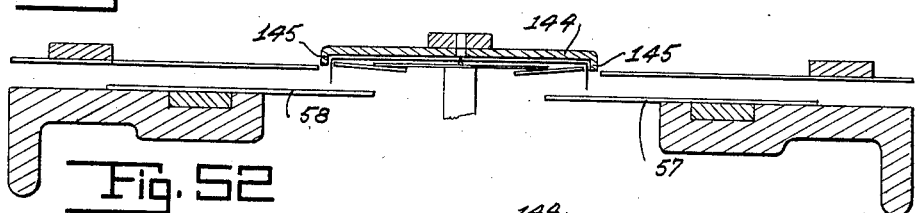
Figure 52:
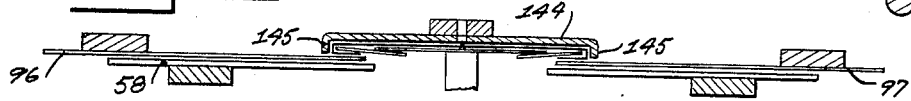
Figure 53:
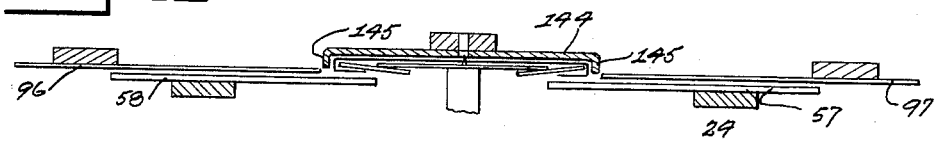
Figure 54:
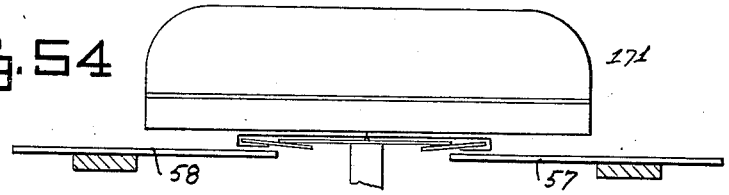
Figure 55:
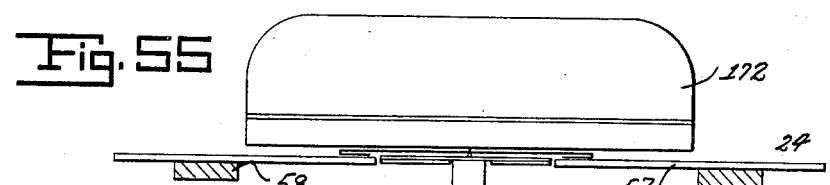
Figure 56:
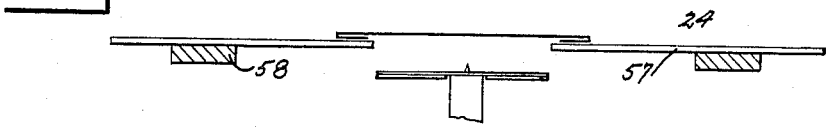
Figure 57:

The invention will be readily understood from the foregoing description when taken in connection with the accompanying drawings. Assuming that the parts are in the position shown in the drawings the blanks are placed by the attendant upon the receiver table 16 of the device 15, and as soon as the machine is operated it will force the blanks so as to be engaged by the needles 33 carried by the templets 25 and will hold the said blanks properly positioned on said templets. The templet drum or turret 34 is given a partial rotation which places the blank directly under the infolding mechanism 94, the templet plates having been expanded previous to receiving the blank thereon. During this time the platen 24 has been raised somewhat by reason of one of the arms 88 moving around the cam 83, but not to interfere with the infolding operation, and as soon as the templet carrying the blank to be folded is properly positioned, the infolder frame or head 113 is lowered by means of the sleeves 137, arms 139, shaft 140, arm 141, lever 142 and cam 143 located on the shaft 32. As the said frame with the infolder members or plates are forced downward the matrix or element 144 by reason of its flanges 145 which conform to the general contour of the expanded templet plates, will force the blank around the templet plates so as to sharply define the outline thereof as shown in Fig. 51, the said element yielding somewhat by reason of the action of the springs 150 arranged around the stems 149 of the supporting rods 148. As soon as the blank has been folded by the element 144 as shown in Fig. 51 the infolder plates or members will be operated through the shafts 119 and 120 and the mechanism previously described so as to move the infolder plates either simultaneously or one in advance of the other according to the adjustment of the segmental gears 125 and 126, Fig. 10, relatively to the toothed disks 121 and 122 thus forcing the part to be infolded under the templet plates as shown best in Figs. 6 and 52. The infolder plates in Fig. 53 and the templet members at this time are in such a position as to permit movement of the infolder plates and still confine the infolded part of the blank between the platen and the templet plates to prevent the withdrawal of the folded edges, the cam 75 being then operated by means of the lever 76 and cam 78 so as to permit the arm 73 of this platen to fall into the cut-away part 82 of the cam 81, thus forcing the platen members outward by reason of the operating springs 63 so as to grip the folded blank between the platen members and the templet plates. Movement is then imparted to the templet drum or turret 34 to place the folded blank opposite the ironing device 171, the blank to be folded at the same time being moved by its templet under the infolding mechanism. As the blank is placed under the ironing device 171 an inward movement will be imparted thereto so as to initially press the blank about the templet plates, the said blank being held to the face of the templets, in addition to the needles 33, by reason of the tapes 192, the said ironing device having apertures to prevent injury to the needles holding the blanks. On further movement of the folded blank by means of the rotary movement of the turret or templet drum, the folded and initially pressed blank will be placed under the ironing device 172. This heating and ironing device by the mechanism already described is operated simultaneously with the heating and ironing device 171 so that two blanks are being operated on simultaneously, one to be initially ironed and the other subjected to a complete or final operation. This latter operation is effected after the templet has been contracted or collapsed and this is secured by an independent movement of the cam 83 through the arm 84 and its operating cam 87 and through the jog or cut-away part 191, allowing one of the arms 88 to enter said jog or cut-away portion as shown in Fig. 33, the initial ironing being shown in Fig. 54, while the complete or final ironing is shown in Fig. 55 wherein the blank is effectively pressed between the platen and said ironing device. Before the templet plates are contracted for the final pressing and ironing, the platen has its pressure against the blank removed slightly by means of the part 190 of the cam 75 so that the templet plates can be moved more easily, the ironing devices being moved outwardly after the pressing has been accomplished. A partial rotation is now given to the templet drum to place the folded and pressed blank over the endless belts or aprons 197, and by reason of the movement of one of the arms 73 will force the platen members downward beyond the templet plates and thereby force the folded blank therefrom and cause the same to be discharged on to said belts as shown in Figs. 56 and 57, though the position of the templet and platen at this time are in the reverse position to that shown, so that the blank would be face downward instead of upward. As the belts travel forward the folded blanks will be deposited upon the holder 201 and properly stacked so that the attendant can remove a number of the same at will. The operation has been described as following a single blank but as the turret is rotated other blanks will be successively presented to the several parts of the machine, so that while one blank is being infolded others are being heated and pressed and discharged thereby having the machine operate on several blanks simultaneously.

It will be understood that more than one infolding mechanism or one or more heating and ironing devices may be employed, and that the heating and ironing means may be independent of each other, if preferred.

From the foregoing it will be seen that a simple, effective and easily controlled machine for infolding collars and other articles is provided; that said device in having a plurality of templets either adapted to rotate or otherwise move permits the machine to operate simultaneously on a plurality of blanks so that as one blank is being received another is folded and pressed, and the finished blank discharged and stacked; that simple and efficient infolding and forming mechanism is provided for the blanks; that the infolding members or plates may be adapted to be operated simultaneously or one in advance of another; that effective and simple heating and ironing means are provided; that said machine is so made that it will be under the absolute control of the attendant to adapt the same to be operated intermittently or continuously; and that said machine is so constructed as to materially save time and much labor and produces better results than by the method ordinarily employed for folding articles of the class referred to.

Having thus described my invention, I claim as new and desire to secure by Letters Patent:—

1. In an infolding machine, the combination with a plurality of movable templets having expanding and contracting plates, of a fixed support, a single infolding mechanism movably mounted on said support, and means for successively presenting the templets adjacent to the infolding mechanism.

2. In an infolding machine, the combination with a plurality of rotary and reciprocatory templets, of a single infolding means, and means for successively presenting the templets adjacent to the infolding means.

3. In an infolding machine, the combination with a plurality of movable templets having expanding and contracting members, of a single infolding mechanism, and means for successively presenting the templets adjacent to the infolding mechanism.

4. In an infolding machine, the combination with a plurality of rotary templets having contracting and expanding members, of single infolding means, and means for successively presenting the templets adjacent to the infolding means.

5. In an infolding machine, the combination with a plurality of movable templets having contracting and expanding plates, of a single infolding means having a vertical movement toward the templets in succession and a horizontal movement while infolding, and means for moving the templets and infolding means toward each other.

6. In an infolding machine, the combination with a plurality of movable templets provided with contracting and expanding plates having two distinct bodily movements one lateral with respect to the other, of means for feeding the blanks to the templets, a single infolding means, together with means for intermittently moving the templets and blanks carried thereby for successively presenting the templets adjacent to the infolding means.

7. In an infolding machine, the combination with a plurality of rotary templets, of means for feeding the blanks to the templets, a single infolding means having two distinct movements one lateral with respect to the other, together with means for intermittently moving the templets and blanks carried thereby for successively presenting the templets adjacent to the infolding means.

8. In an infolding machine, the combination with a plurality of rotary and reciprocatory templets, of means for feeding the blanks to the templets, infolding means, together with means for intermittently moving the templets and infolding means toward each other.

9. In an infolding machine, the combination with a plurality of templets each having contracting and expanding members, of infolding mechanism, means for successively moving the templets adjacent to the infolding mechanism, a platen coöperating with each of the templets, together with a heating and ironing device independent of the folding mechanism and the templets.

10. In an infolding machine, the combination with a plurality of rotary and reciprocatory templets, of a single infolding mechanism, and means for successively presenting the templets to the infolding mechanism.

11. In an infolding machine, the combination with infolding mechanism, of a plurality of rotary and reciprocatory templets having contracting and expanding plates each serving as a carrying and holding means for the blank, and means for moving the templets adjacent to the folding means.

12. In an infolding machine, the combination with vertically movable infolding mechanism, of a plurality of rotary and reciprocatory templets each having contracting and expanding plates, each serving as a carrying and holding means for the blank, and means for moving the templets adjacent to the folding means about the same.

13. In an infolding machine, the combination with infolding mechanism, of a plurality of rotary templets having contracting and expanding plates, each serving as a carrying and holding means for the blank, and means for moving the templets adjacent to the folding means above the same.

14. In an infolding machine, the combination with a plurality of rotary blank-supporting templets, of infolding mechanism past which the templets are adapted to be moved, said mechanism being entirely independent of the templets and having infolding plates movable toward the templets and adapted to fold the edges of the blanks in succession under the templets as they are successively presented thereto and after the templets have moved past said infolding mechanism.

15. In an infolding machine, the combination with a plurality of blank-supporting templets, of infolding mechanism past which the templets are adapted to be moved, said mechanism being entirely independent of the templets and their movements and having infolding plates movable toward the templets and adapted to fold the edges of the blanks under the templets after the latter have been moved past said mechanism.

16. In an infolding machine, the combination with infolding mechanism, of a plurality of heating and pressing devices independent of each other, and a plurality of rotary templets each adapted to serve as a carrier for a blank and to have the same moved therewith to be presented successively to the infolding mechanism and the heating and pressing devices.

17. In an infolding machine, the combination with infolding mechanism, of a plurality of movable templets, a platen movable with each templet, and devices independent of each other for pressing the folded blank at two distinct operations as the blank moves with the templets.

18. In an infolding machine, the combination with infolding mechanism, of a plurality of rotatable and reciprocatory templets, a platen movable with each templet, and devices independent of each other for pressing the folded blank at two distinct operations.

19. In an infolding machine, the combination with a plurality of rotatable templets, a platen movable with and surrounding each templet, infolding mechanisms, and pressing means for pressing the blank directly against the platen.

20. In an infolding machine, the combination with a templet having contracting and expanding members, of infolding mechanism, a platen conforming to the shape of the templet and coöperating and movable therewith and having also a movement independent of the movement of the templet, together with an ironing and pressing device independent of the templet, infolding mechanism and platen.

21. In an infolding machine, the combination with a plurality of templets each having contracting and expanding plates, of a single infolding mechanism, means for successively moving the templets adjacent to the infolding mechanism, and a platen movable with and coöperating with each of the templets.

22. The combination with a plurality of templets, each provided with contracting and expanding plates, of infolding mechanism, a platen movable with each templet and coöperating therewith to assist in holding the blanks, together with heating and pressing devices acting on the blanks in succession.

23. The combination with a templet provided with contracting and expanding plates, of infolding means, a platen movable with the templet and coöperating therewith to assist in folding the blanks, together with heating and pressing devices adapted to iron the blanks.

24. The combination with a plurality of movable templets, each provided with contracting and expanding plates, of a single infolding means, together with a plurality of heating and pressing devices acting on the blanks in succession, said blanks being presented to the devices during the movement of the templets and in succession.

25. The combination with a plurality of templets, each provided with contracting and expanding plates, of infolding mechanism, an independently movable platen for each templet coöperating therewith to assist in folding the blanks, together with a heating and pressing device for ironing the blanks.

26. In an infolding machine, the combination with a rotary drum having a plurality of templets arranged thereon and spaced apart and each provided with contracting and expanding plates, of means for feeding the blanks successively to the templets, means for holding the blanks to the templets, a single infolding mechanism, means for successively presenting the templets adjacent to the infolding mechanism, means for operating the infolders to fold the blanks about the templets, a platen coöperating with each of the templets, an initial heating and pressing device for pressing the blank while the templet plates are expanded, a second heating and pressing device for pressing the folded blank between said device and the platen after the templet plates have been contracted, means for holding the blanks to the templets during the pressing operation, means for discharging the blanks from the templets, a carrier, and means whereby the folded blanks may be properly stacked.

27. In an infolding machine, the combination with a rotary drum having a plurality of templets arranged thereon and spaced apart and each provided with contracting and expanding plates, of means for feeding the blanks successively to the templets, means for holding the blanks to the templets, infolding means, means for successively presenting the templets adjacent to the infolding means, means for operating the infolding means to fold the blanks about the templets, a platen coöperating with each of the templets, an initial heating and pressing device for pressing the blank while the templet plates are expanded, and a second heating and pressing device for pressing the folded blank between said device and the platen after the templet plates have been contracted.

28. In an infolding machine, the combination with a plurality of templets spaced apart and each provided with contracting and expanding plates, of means for holding the blanks to the templets, a single infolding mechanism, means for successively presenting the templets adjacent to the infolding mechanism, means for operating the infolding mechanism to fold the blanks about the templets, a platen coöperating with the templets, a heating and pressing device for pressing the blank, and means for holding the blanks to the templets during the pressing operation.

29. In an infolding machine, the combination with a rotary drum having a plurality of templets arranged thereon and spaced apart and each provided with contracting and expanding plates, of means for feeding the blanks successively to the templets, means for holding the blanks to the templets, a single infolding mechanism, and means for successively presenting the templets adjacent to the infolding mechanism.

30. In an infolding machine, the combination with a plurality of templets spaced apart and each provided with contracting and expanding plates, of means for holding the blanks to the templets, infolding means, means for successively presenting the templets adjacent to the infolders, means for operating the infolding means, to fold the blanks about the templets, a platen coöperating with the templets, an initial heating and pressing device for pressing the blank while the templet plates are expanded, and a second heating and pressing device for pressing the folded blank between said device and the platen after the templet plates have been contracted.

31. In an infolding machine, the combination with a plurality of templets spaced apart and each provided with contracting and expanding plates, of a single infolding means, means for operating the infolding means to fold the blanks about the templets, a platen coöperating with each of the templets, and a heating and pressing device independent of the platen and templets for ironing the blanks.

32. In an infolding machine, the combination with a rotary drum having a plurality of templets arranged thereon and spaced apart and each provided with contracting and expanding plates, of means for holding the blanks to the templets, infolding means, means for operating the infolding means to fold the blanks about the templets, a platen coöperating with each of the templets and movable with the drum, an initial heating and pressing device for pressing the blank while the templet plates are expanded, a second heating and pressing device for pressing the folded blanks between said device and the platen after the templet plates have been contracted, and means whereby the folded blanks may be properly stacked.

33. In an infolding machine, the combination with a rotary drum having a plurality of templets arranged thereon and spaced apart and each provided with contracting and expanding plates, of means for feeding the blanks successively to the templets, means for holding the blanks to the templets, infolding means, means for successively presenting the templets adjacent to the infolding means, means for operating the infolders to fold the blanks about the templets, a platen coöperating with the templets and movable with the drum, heating and pressing means, and means whereby the folded blanks may be properly stacked.

34. In an infolding machine, the combination with a plurality of templets spaced apart and each provided with contracting and expanding plates, of means for feeding the blanks successively to the templets, infolding means, means for operating the infolding means to fold the blanks about the templets, a platen coöperating with the templets, heating and pressing means, transfer mechanism, and means whereby the folded blanks may be properly stacked.

35. In an infolding machine, the combination with a templet provided with contracting and expanding plates, of means for infolding blanks, means for operating the infolding means to fold the blanks about the templet, a platen coöperating and movable with the templet and also having a movement toward and away from said templet, an initial heating and pressing device for pressing the blank while the templet plates are expanded, and a second heating and pressing device for pressing the folded blank between said second device and the platen after the templet plates have been contracted.

36. In an infolding machine, the combination with a plurality of templets each provided with contracting and expanding plates, of means for feeding the blanks to the templets, means for holding the blanks to the templets to move therewith, a single infolding means independent of the templets, an initial heating and pressing device for pressing the blanks while the templet plates are expanded, a second heating and pressing device for pressing the folded blank after the templet plates have been contracted, and means for moving the templets and blanks to present the same in succession to the infolding means and to the heating and pressing devices.

37. In an infolding machine, the combination with a plurality of templets each provided with contracting and expanding plates, of a single and independent infolding means, an initial pressing device having the blank presented to the same by the movement of the templets for pressing the blank while the templet plates are expanded, and a second pressing device for pressing the folded blank after the templet plates have been contracted and while movable with the templet, said templets being movable to the pressing devices.

38. In an infolding machine, the combination with a plurality of templets spaced apart and each provided with contracting and expanding plates, of infolding means, pressing means, means for holding the blanks to the templets during the pressing operation, a carrier, and means whereby the folded blanks may be properly stacked.

39. In an infolding machine, the combination with a plurality of templets spaced apart and each provided with contracting and expanding plates, of infolding means, means for pressing the folded blanks, a platen coöperating with the templets, a carrier, and means whereby the folded blanks may be properly stacked.

40. In an infolding machine, the combination with a rotary drum having a plurality of templets arranged thereon and spaced apart and each provided with contracting and expanding plates, of a single infolding means, means for successively presenting the templets adjacent to the infolding means, means for operating the infolding means to fold the blanks about the templets, a platen coöperating with the templets, heating and pressing means, means for holding the blanks to the templets during the pressing operation, a carrier, and means whereby the folded blanks may be properly stacked.

41. In an infolding machine, the combination with a plurality of templets spaced apart and each provided with contracting and expanding plates, of a single infolding means, means for operating the infolding means to fold the blanks about the templets, a platen coöperating with the templets, heating and pressing means, means for holding the blanks to the templets during the pressing operation, means for discharging the blanks from the templets, a carrier, and means whereby the folded blanks may be properly stacked.

42. In an infolding machine, the combination with a movable templet, of an oscillatory receiving device on which the blank to be folded is placed, and means for forcing the device over the templet to place the blank on the templet by said device.

43. In an infolding machine, the combination with a movable templet, of an upwardly and inwardly movable receiving device having a table and guides on which the blank to be folded is placed, and means for forcing the device over the templet to place the blank directly on the templet by said device.

44. In an infolding machine, the combination with a movable templet having needles thereon, of an oscillatory receiving device on which the blank to be folded is placed, and means for moving the device over the templet to force the blank on to the needles and on the upper face of the templet.

45. In an infolding machine, the combination with a templet and infolding mechanism, of needles carried by the templet, an oscillatory and inwardly movable receiving device on which the articles to be folded are placed, together with means for operating said device to force the blank over the needles and upon the upper face of the templet.

46. In an infolding machine, the combination with a templet and infolding mechanism, of means carried by the templet adapted to engage the blank when deposited thereon, an oscillatory receiving device on which the articles to be folded are placed, together with means for operating said device to force the blank into engagement with the means carried by the templet and upon the upper face of said templet.

47. In an infolding machine, the combination with a movable templet and infolding means, of needles movable with the templet, an upwardly and inwardly moving receiving device on which the articles to be folded are placed, together with means for operating said device to force the blanks over the needles and upon the upper face of the templet.

48. In an infolding machine, the combination with a templet and infolding mechanism, of needles, an oscillatory receiving device on which the articles to be folded are placed, together with means for operating said device to force the blanks over the needles and upon the upper face of the templet.

49. In an infolding machine, the combination with a movable templet, of a platen coöperating and movable therewith and movable relatively toward and from the templet, infolding mechanism, a receiving device having guides thereon adapted to receive the blanks to be folded, supporting arms, means for swinging the arms and the device toward the templet, and a yielding connection between the device and said arms.

50. In an infolding machine, the combination with a templet, of a platen coöperating therewith and movable relatively to the templet, infolding mechanism, a receiving device having guides thereon adapted to receive the blanks to be folded, needles carried by the templet, supporting arms, and means for swinging the arms and the device toward the templet.

51. In an infolding machine, the combination with a templet, of a platen coöperating and movable therewith, infolding mechanism, a receiving device having guides thereon adapted to receive the blanks to be folded, an arm, and a yielding connection between the device and said arm.

52. In an infolding machine, the combination with a plurality of templets, each having a plurality of needles movable therewith, of infolding mechanism, a device comprising a table having guides thereon between which the blanks to be folded are placed, pivotally held arms, a yielding connection between the table and the arms, means for swinging the arms, together with rods held to the arms and having means thereon for forcing the blank over the needles.

53. In an infolding machine, the combination with a templet, of infolding mechanism, a device comprising a table having guides thereon between which the blanks to be folded are placed, pivotally held arms, a yielding connection between the table and the arms, means for swinging the arms, means for engaging the blank located adjacent to the templet, together with rods held to the arms and having means thereon for forcing the blank over said engaging means.

54. In an infolding machine, the combination with a plurality of templets, each having a plurality of needles movable therewith, of infolding mechanism, a device having guides thereon between which the blanks to be folded are placed, pivotally held arms, means for moving the arms, together with means carried by the arms for forcing the blanks over the needles.

55. In an infolding machine, the combination with a templet having a plurality of needles movable therewith, of infolding mechanism, a device having guides thereon between which the blanks to be folded are placed, pivotally held arms, means for swinging the arms, together with rods held to the arms for forcing the blanks over the needles.

56. In an infolding machine, the combination with a plurality of templets, each having a plurality of needles movable therewith, of infolding mechanism, a device comprising a table having guides thereon between which the blanks to be folded are placed, pivotally held arms, a yielding connection between the table and the arms, means for swinging the arms, together with rods having openings in their ends held to the arms and having collars thereon for forcing the blanks over the needles.

57. The combination with a plurality of templets, each having contracting and expanding plates, of means for intermittently moving the templets including a drive shaft, a cam having an independent movement relatively to the movement of the templets, an arm carried by each templet adapted to move around the periphery of the cam, together with means for moving the said cam to cause the templet plates to be contracted or expanded.

58. The combination with a plurality of templets, each having contracting and expanding plates, of means for intermittently moving the templets including a drive shaft, a normally stationary cam about which the templets move and having an independent movement relatively to the movement of the templets, and means for giving a partial rotary movement to the cam to cause the templet plates to be contracted or expanded.

59. The combination with a plurality of templets, each having contracting and expanding plates, of infolding mechanism, means for pressing the blanks after being infolded, means including a drive shaft for intermittently moving the templets, a platen coöperating with each templet and movable relatively thereto, a cam loosely mounted on the shaft and having a relative independent movement with respect to the movement of the platen, means movable with each platen and engaged by the cam whereby the platen may be moved inwardly or outwardly while the templet remains stationary, and means for operating the cam.

60. The combination with a plurality of templets, each having contracting and expanding plates, of infolding mechanism, means including a drive shaft for intermittently moving the templets, a platen coöperating with each templet and movable relatively thereto, and a cam loosely mounted on the shaft and having a relative independent movement with respect to the movement of the platen.

61. The combination with a templet having contracting and expanding plates, of infolding mechanism, means for pressing the blanks after being infolded, means including a drive shaft for moving the templet, a platen coöperating with the templet and movable relatively thereto, a cam loosely mounted on the shaft and having a relative independent movement with respect to the movement of the platen, means movable with the platen and engaged by the cam whereby the platen may be moved inwardly or outwardly while the templet remains stationary, and means for operating the cam.

62. The combination with a plurality of circularly moving templets, each having contracting and expanding plates, of infolding mechanism, means including a drive shaft for intermittently moving the templets, a platen coöperating with each templet and movable relatively thereto, a cam loosely mounted on the shaft and having a relative independent movement with respect to the movement of the platen, and means for operating the cam.

63. The combination with a plurality of templets, each having contracting and expanding plates, of infolding means, means for pressing the blanks after being infolded, means including a drive shaft for intermittently moving the templets, a platen coöperating with each templet and movable relatively thereto, a cam loosely mounted on the shaft and having a relative independent movement with respect to the movement of the platen, an arm movable with each platen and engaged by the cam whereby the platen may be moved inwardly or outwardly while the templet remains stationary, and means for operating the cam.

64. The combination with a plurality of templets, each having contracting and expanding plates, of infolding mechanism, means for feeding blanks to the templets, a platen surrounding each templet and having two members, means including a shaft for intermittently moving the templets and platen in unison, a cam mounted to move independently of the shaft, means carried by the templets whereby the cam causes the templet plates to be contracted or expanded, a second cam independently movable on said shaft, means for moving said cam, together with means engaged by the cam and movable with each platen whereby the platen may be moved inwardly and outwardly relatively to the templets.

65. The combination with a plurality of templets, each having contracting and expanding plates, of infolding mechanism, a platen surrounding each templet and having two members, means including a shaft for intermittently moving the templets and platen in unison, a cam mounted to move independently of the shaft, arms carried by the templets whereby the cam causes the templet plates to be contracted or expanded, a second cam independently movable on said shaft, means for moving said cam, together with means engaged by the second cam and movable with each platen whereby the platen may be moved inwardly and outwardly relatively to the templets.

66. The combination with a templet having contracting and expanding plates, of infolding means, means for feeding blanks to the templet, a platen surrounding the templet, means including a shaft for moving the templet and platen in unison, a cam mounted to move independently of the shaft, means carried by the templet whereby the cam causes the templet plates to be contracted or expanded, a second cam independently movable on said shaft, means for moving said cam, together with arms engaged by the second cam and movable with the platen whereby the platen may be moved inwardly and outwardly relatively to the templet.

67. The combination with a plurality of templets each having contracting and expanding plates, of infolding mechanism, means for feeding blanks to the templets, a platen surrounding each templet, means including a shaft for intermittently moving the templets and platen in unison, a cam mounted to move independently of the shaft, arms carried by the templets whereby the cam causes the templet plates to be contracted or expanded, a second cam independently movable on said shaft, means for moving said cam, together with arms engaged by the second cam and movable with each platen whereby the platen may be moved inwardly and outwardly relatively to the templets.

68. In an infolding machine, the combination with a plurality of templets each having contracting and expanding plates, of blocks to which the plates are secured, a lever and connections between the lever whereby the blocks may be moved to expand or contract the plates, a gear secured to the lever, a second gear in mesh with the former gear, one for each templet, a shaft to which the gear is secured, a cam, and an arm held to the shaft and adapted to control through the cam the position of the templet plates.

69. In an infolding machine, the combination with a plurality of rotary templets each having contracting and expanding plates, of blocks to which the plates are secured, a lever and connections between the lever whereby the blocks may be moved to expand or contract the plates, a gear secured to the lever, a second gear in mesh with the former gear, one for each templet, a shaft to which the gear is secured, a cam, and means engaging the cam to position the templet plates.

70. In an infolding machine, the combination with a templet, of means for folding a blank about the templet, a platen coöperating with the templet, rods to which the platen is secured, springs arranged around the rods and normally forcing the platen outward, and means for forcing the rods against the action of the springs, said means including a cam, an arm movable around the periphery of the cam, intermediate segments, and connections between the segments and said rods.

71. In an infolding machine, the combination with a movable templet, of means for folding a blank about the templet, a platen coöperating and movable with the templet, rods independent of the platen to which the platen is secured, springs arranged around the rods and normally forcing the platen outward to engage with the templet and clamp the blank between the platen and templet, and means for forcing the rods against the action of the springs.

72. In an infolding machine, the combination with a templet, of means for folding a blank about the templet, of a platen coöperating and movable with the templet, rods to which the platen is held, springs arranged around the rods and normally forcing the platen outward, and means for forcing the rods against the action of the springs, said means including a cam, an arm movable around the periphery of the cam, and connections between the arm and said rods.

73. The combination with a plurality of movable templets, each provided with contracting and expanding plates, of infolding means, reciprocatory platens coöperating with the infolding means and movable with the templets for infolding the blanks, together with a pressing and heating device independent of the templets, platen and infolding means for pressing the blank.

74. The combination with a plurality of movable templets, each provided with contracting and expanding plates, of an infolding mechanism comprising two opposed oppositely movable members and an intermediate member or element independently movable of the members of the infolders and located between the same and adapted to coöperate with the templets to force the blank about the edge of the templets, means for raising and lowering the infolder members, together with means whereby the infolder members may be moved in unison or one in advance of the other.

75. The combination with a templet, provided with contracting and expanding plates, of infolding means comprising two opposed oppositely movable members and an intermediate member or element independently movable of the members of the infolders and located between the same and adapted to coöperate with the templet to force the blank about the edge thereof, means for raising and lowering the infolder members, together with means whereby the infolder members may be moved in unison or one in advance of the other.

76. The combination with a plurality of movable templets, each provided with contracting and expanding plates, of infolding means comprising opposed movable members and an intermediate member or element independently movable of the members of the infolders and located between the same and adapted to coöperate with the templets to force and hold the blank about the edge thereof, together with means for moving the infolder members.

77. The combination with a movable templet provided with contracting and expanding plates, of infolding means comprising opposed movable members, and an intermediate member or element independently movable of the members of the infolders and located between the same and adapted to coöperate with the templet to force the blank about the edge thereof.

78. The combination with a plurality of movable templets, each provided with contracting and expanding plates, of an infolding mechanism comprising two opposed oppositely movable members, and an intermediate member or element independently movable of the members of the infolders and located between the same and adapted to coöperate with the templet to force the blank about the edge thereof.

79. In an infolding machine, the combination with a templet having contracting and expanding plates, of a platen surrounding the templet, infolding members, an independent element coöperating with the infolding members and the templet and platen and adapted to initially force the blank about the templet, means for raising and lowering the infolding members and independent element, together with means for moving the infolder elements inwardly to force the part of the blank to be infolded about the templet above the platen.

80. In an infolding machine, the combination with a templet having contracting and expanding plates, of a platen surrounding the templet, infolding members, an independent element coöperating with the infolding members and the templet and platen, and means for raising and lowering the infolding members and independent element.

81. In an infolding machine, the combination with a templet having contracting and expanding plates, of infolding plates movable to and from each other, rods for supporting the infolding plates, eccentrics movable with the rods and arranged in pairs, there being two eccentrics on opposite sides of the center of each infolding member, gears secured to the rods to operate the same in pairs, bevel gears for independently operating certain of the gears of each pair of rods, an infolding frame head supporting the infolding plates, gears, and shafts, means for raising and lowering the infolder frame head, and means for operating the infolder members inwardly and outwardly.

82. In an infolding machine, the combination with a plurality of templets each having contracting and expanding plates, of vertically movable infolding plates movable to and from each other, rods for supporting the infolding plates, eccentrics movable with the rods and arranged in pairs, there being two eccentrics on opposite sides of the center of each infolding member, and means for operating the eccentrics.

83. In an infolding machine, the combination with a templet having contracting and expanding plates, of infolding plates movable to and from each other, rods for supporting the infolding plates, eccentrics movable with the rods and arranged in pairs, there being two eccentrics on opposite sides of the center of each infolding member, gears secured to the rods to operate the same in pairs, means for operating the gears, an infolding frame head supporting the infolding plates and gears, together with means for raising and lowering the infolder frame head.

84. In an infolding machine, the combination with a templet having contracting and expanding plates, of infolding plates movable to and from each other, rods for supporting the infolding plates, eccentrics movable with the rods, gears secured to the rods to operate the same in pairs, means for operating the gears, an infolding frame head supporting the infolding plates and gears, means for raising and lowering the infolder frame head, and means for moving the infolder members inwardly and outwardly.

85. In an infolding machine, the combination with a templet having contracting and expanding plates, of opposed infolder members, rods arranged in pairs and supporting the members on opposite sides of the center thereof, gears for operating each pair of rods independently, an infolder frame head supporting the rods, a fixed bracket, sleeves movably held in the bracket and connected to the frame head, together with mechanism for operating the sleeves to raise and lower the infolder members.

86. In an infolding machine, the combination with a templet having contracting and expanding plates, of opposed infolder members, rods arranged in pairs and supporting the members on opposite sides of the center thereof, means operating each pair of rods independently, an infolder frame head supporting the rods, a bracket, sleeves movably held in the bracket and connected to the frame head, together with mechanism for operating the sleeves to raise and lower the infolder members.

87. In an infolding machine, the combination with a templet having contracting and expanding plates, of infolder members, rods supporting the members on opposite sides of the center thereof, means for operating the rods, an infolder frame head supporting the rods, a fixed bracket, means movably held in the bracket and connected to the frame head, together with mechanism for operating the last mentioned means to raise and lower the infolder members.

88. In an infolding machine, the combination with a templet having contracting and expanding plates, of opposed infolder members movable toward and from each other, means for moving the members to infold the blank about the templet, a bracket, sleeves movably held in the bracket, means for raising and lowering the sleeves and thereby the infolder members, rods yieldingly held in said sleeves, together with an element secured to the rods and coöperating with the infolder members, and the templet to fold the blanks.

89. In an infolding machine, the combination with a templet having contracting and expanding plates, of opposed infolder members movable toward and from each other, means for moving the members to infold the blank about the templet, sleeves connected to the infolder members, means for raising and lowering the sleeves and thereby the infolder members, rods yieldingly held in said sleeves, together with an element secured to the rods and coöperating with the infolder members, and the templet to fold the blanks.

90. In an infolding machine, the combination with a templet having contracting and expanding plates, of vertically movable infolding mechanism having an element for initially folding the edges of the blank downwardly about the templet and coöperating with the templet and held to the infolder mechanism to move vertically therewith.

91. In an infolding machine, the combination with a templet having contracting and expanding plates, of vertically movable infolding mechanism having an independent reciprocatory element for initially folding the edges of the blank downwardly about the templet and coöperating with the templet and movable with the infolding mechanism.

92. In an infolding machine, the combination with a templet, of infolding mechanism adapted to fold the blank about the templet and having an independent element adapted to initially fold the blank about the templet and coöperating with the infolding mechanism and the templet, a rod secured to said element and having engaging means at one end, and a spring-retained latch adapted to engage the end of said rod and hold the same in an elevated position, for the purpose set forth.

93. In an infolding machine, the combination with a templet, of infolding mechanism adapted to fold the blank about the templet and having an independent element coöperating with the infolding mechanism and the templet, a rod secured to said element and having engaging means at one end, and a slidingly held latch adapted to engage the end of said rod and hold the same in an elevated position.

94. In an infolding machine, the combination with a templet, of infolding mechanism adapted to fold the blank about the templet and having an independent element coöperating with the infolding mechanism and the templet, a rod secured to said element and having a groove at one end, and a spring retained latch adapted to engage the groove in said rod and hold the same in an elevated position, for the purpose set forth.

95. In an infolding machine, the combination with a templet having contracting and expanding plates, of infolder plates oppositely arranged and movable toward and from each other, together with an adjusting mechanism for operating the infolder plates in unison or one in advance of the other, and comprising a sleeve, two independently movable segmental gears, said sleeve having teeth thereon, screws engaging the teeth whereby the segments may be shifted relatively with respect to each other, toothed wheels in mesh with the segmental gears on opposite sides of the sleeve, stop means carried by the segmental gears and movable therewith and adapted to determine their position, connections between the segmental gears and the infolder members to operate the same, an arm connected to the sleeve, together with means for moving the arm whereby the infolder members may be moved in unison or one in advance of the other.

96. In an infolding machine, the combination with a templet having contracting and expanding plates, of infolder plates oppositely arranged and movable toward and from each other, means for moving said plates inward and outward, together with an adjusting mechanism for operating the infolder plates in unison or one in advance of the other, and comprising a sleeve, two independently movable segmental gears mounted on the sleeve, said sleeve having teeth thereon, screws engaging the teeth whereby the gears may be shifted relatively with respect to each other, and means for operating the gears.

97. In an infolding machine, the combination with a templet having contracting and expanding plates, of infolder plates oppositely arranged and movable toward and from each other, together with an adjusting mechanism for operating the infolder plates in unison or one in advance of the other and comprising a sleeve, two independently movable segmental gears mounted on the sleeve, said sleeve having teeth thereon, screws engaging the teeth whereby the gears may be shifted relatively with respect to each other, toothed wheels in mesh with the segmental gears on opposite sides of the sleeve, stop means carried by the segmental gears and movable therewith and adapted to determine their position, and connections between the toothed wheels and the infolder members to operate the latter.

98. In an infolding machine, the combination with a templet having contracting and expanding plates, of infolder plates oppositely arranged and movable toward and from each other, together with an adjusting mechanism for operating the infolder plates in unison or one in advance of the other and comprising a sleeve, two independently movable segmental gears mounted on the sleeve, said sleeve having teeth thereon, means engaging the teeth whereby the gears may be shifted relatively with respect to each other, toothed wheels in mesh with the gears on opposite sides of the sleeve, locking devices carried by the segmental gears and movable therewith and adapted to determine their position, and connections between the toothed wheels and the infolder members to operate the latter.

99. In an infolding machine, the combination with a plurality of templets each having contracting and expanding plates, of a platen coöperating with the templet plates, a plurality of heating and pressing devices movable toward the templets, electrical connections for heating said devices, together with means for moving said devices simultaneously.

100. In an infolding machine, the combination with a templet having contracting and expanding plates, of a platen coöperating with the templet plates, a plurality of heating and pressing devices movable toward the templet and acting upon the blank in succession, electrical connections for heating said devices together with means for moving said devices simultaneously.

101. In an infolding machine, the combination with a plurality of templets each having contracting and expanding plates, of a platen coöperating with the templet plates, a plurality of pressing devices movable toward the templets and acting upon the blank carried thereby in succession, and means for heating said devices.

102. In an infolding machine, the combination with a plurality of templets each having contracting and expanding plates, of a platen coöperating with each templet, a plurality of heating and pressing devices movable toward the templets and platens, one coöperating with the templet and platen to press the blank and the other with the platen, electrical connections for heating said devices, together with means for moving said devices simultaneously.

103. In an infolding machine, the combination with a templet having contracting and expanding plates, of a platen coöperating and movable with the templet, a pressing device movable toward the templet, and electrical connections for heating said device.

104. The combination with a templet, of an ironing device comprising a head, a heating plate, electrical connections for heating the plate, a sleeve projecting from the head and provided with teeth on one side thereof, a segment engaging the teeth, a shaft to which the segment is secured, an arm having a limited movement on the shaft, a spring connecting the arm to the segment and arranged around the shaft, together with means for operating the arm.

105. The combination with a templet, of an ironing device comprising a head, a heating plate, means for heating the plate, a sleeve projecting from the head and provided with teeth on one side thereof, a segment engaging the teeth, a shaft to which the segment is secured, and means for operating the shaft.

106. The combination with a templet, of an ironing device comprising a head, a heating plate, electrical connections for heating the plate, a sleeve projecting from the head and provided with teeth on one side thereof, a segment engaging the teeth, a shaft to which the segment is secured, and means for operating the shaft.

107. In a machine of the character described, the combination with a plurality of templets, of infolding mechanism, a plurality of ironing devices, and endless tapes for holding the blanks to the templets while being pressed.

108. The combination with a plurality of templets, of means for feeding the blanks to be folded to the templets, a single infolding mechanism, means for successively presenting the templets adjacent to the infolding mechanism, a plurality of pressing devices, a plurality of endless tapes normally engaging the templets and holding the blanks thereto while being pressed, means for discharging the blanks from the templets, and endless carriers for removing the blanks as they are discharged.

109. The combination with a templet, of means for feeding the blanks to be folded to the templet, infolding mechanism, means for moving the templet adjacent to the infolding mechanism, a pressing device, endless means normally engaging the templets and holding the blanks thereto while being pressed, and endless carriers for removing the blanks as they are discharged.

110. The combination with a plurality of templets, of means for feeding the blanks to be folded to the templets, infolding mechanism, means for successively presenting the templets adjacent to the infolding mechanism, a pressing device, a plurality of endless tapes normally engaging the templets and holding the blanks thereto while being pressed, means for discharging the blanks from the templets, and endless carriers for removing the blanks as they are discharged.

This specification signed and witnessed this 27th day of July, A. D. 1908.

BENJAMIN W. TUCKER.

Witnesses:
FREDERICK B. BLACKMAN,
L. R. COMPTON.

Copies of this patent may be obtained for five cents each, by addressing the "Commissioner of Patents, Washington, D. C."